United States Patent
Emma et al.

(10) Patent No.: US 10,338,923 B2
(45) Date of Patent: Jul. 2, 2019

(54) BRANCH PREDICTION PATH WRONG GUESS INSTRUCTION

(75) Inventors: Philip G. Emma, Danbury, CT (US); Allan M. Hartstein, Chappaqua, NY (US); Keith N. Langston, Woodstock, NY (US); Brian R. Prasky, Wappingers Falls, NY (US); Thomas R. Puzak, Ridgefield, CT (US); Charles F. Webb, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 722 days.

(21) Appl. No.: 12/435,631

(22) Filed: May 5, 2009

(65) Prior Publication Data

US 2010/0287358 A1  Nov. 11, 2010

(51) Int. Cl.
*G06F 9/30* (2018.01)
*G06F 9/38* (2018.01)
(Continued)

(52) U.S. Cl.
CPC ........ *G06F 9/30047* (2013.01); *G06F 8/4442* (2013.01); *G06F 9/3005* (2013.01); *G06F 9/30054* (2013.01); *G06F 9/30058* (2013.01); *G06F 9/30076* (2013.01); *G06F 9/3802* (2013.01); *G06F 9/383* (2013.01); *G06F 9/3804* (2013.01); *G06F 9/3806* (2013.01); *G06F 9/3842* (2013.01); *G06F 9/3844* (2013.01); *G06F 9/3846* (2013.01); *G06F 9/3848* (2013.01); *G06F 12/0862* (2013.01); *G06F 2212/6028* (2013.01)

(58) Field of Classification Search
CPC .............. G06F 8/4442; G06F 9/30047; G06F 9/30054; G06F 9/30058; G06F 9/3844; G06F 9/3846; G06F 9/3848; G06F 12/0862; G06F 2212/6028; G06F 9/3802; G06F 9/3842; G06F 9/3806; G06F 9/3005
See application file for complete search history.

(56) References Cited

U.S. PATENT DOCUMENTS 4,370,711 A  1/1983  Smith
4,679,141 A  7/1987  Pomerene et al.
(Continued)

OTHER PUBLICATIONS

Comp.arch (ARM V5: Preload with separate I and D Cache); Newsgroup: comp.arch; thread spanning Sep. 11, 2003 to Sep. 20, 2003; 29 pages.*

(Continued)

*Primary Examiner* — Keith E Vicary
(74) *Attorney, Agent, or Firm* — Cantor Colburn LLP

(57) ABSTRACT

A method for branch prediction, the method comprising, receiving a branch wrong guess instruction having a branch wrong guess instruction address and data including an opcode and a branch target address, determining whether the branch wrong guess instruction was predicted by a branch prediction mechanism, sending the branch wrong guess instruction to an execution unit responsive to determining that the branch wrong guess instruction was predicted by the branch prediction mechanism, and receiving and decoding instructions at the branch target address.

9 Claims, 18 Drawing Sheets

(51) Int. Cl.
*G06F 12/0862* (2016.01)
*G06F 8/41* (2018.01)

(56) References Cited

U.S. PATENT DOCUMENTS

| | | | |
|---|---|---|---|
| 5,606,675 A * | 2/1997 | Sakamura et al. | 712/237 |
| 5,642,493 A * | 6/1997 | Burgess | 711/116 |
| 5,682,531 A | 10/1997 | Nakamura | |
| 5,742,804 A | 4/1998 | Yeh et al. | |
| 5,774,685 A | 6/1998 | Dubey | |
| 5,796,971 A * | 8/1998 | Emberson | 712/207 |
| 5,859,999 A | 1/1999 | Morris et al. | |
| 5,987,495 A | 11/1999 | Ault et al. | |
| 6,029,228 A * | 2/2000 | Cai et al. | 711/137 |
| 6,055,621 A * | 4/2000 | Puzak | 712/207 |
| 6,092,188 A | 7/2000 | Corwin et al. | |
| 6,108,775 A | 8/2000 | Shiell et al. | |
| 6,189,091 B1 | 2/2001 | Col et al. | |
| 6,272,623 B1 | 8/2001 | Talcott | |
| 6,308,322 B1 | 10/2001 | Serocki et al. | |
| 6,324,643 B1 | 11/2001 | Krishnan et al. | |
| 6,408,325 B1 | 6/2002 | Shaylor | |
| 6,427,192 B1 | 7/2002 | Roberts | |
| 6,560,693 B1 * | 5/2003 | Puzak et al. | 712/207 |
| 6,611,910 B2 | 8/2003 | Sharangpani et al. | |
| 6,671,762 B1 | 12/2003 | Soni et al. | |
| 6,725,365 B1 * | 4/2004 | Cofler et al. | 712/233 |
| 6,760,835 B1 | 7/2004 | Yu | |
| 6,877,089 B2 | 4/2005 | Sinharoy | |
| 6,957,327 B1 | 10/2005 | Gelman et al. | |
| 7,197,630 B1 | 3/2007 | Alsup et al. | |
| 7,272,664 B2 | 9/2007 | Arimilli et al. | |
| 7,441,110 B1 * | 10/2008 | Puzak et al. | 712/237 |
| 7,870,371 B2 * | 1/2011 | Mutlu et al. | 712/239 |
| 2002/0194462 A1 * | 12/2002 | Henry et al. | 712/238 |
| 2005/0278513 A1 | 12/2005 | Aristodemou et al. | |
| 2006/0218385 A1 * | 9/2006 | Smith et al. | 712/238 |
| 2007/0083739 A1 * | 4/2007 | Glew | 712/239 |
| 2007/0088915 A1 * | 4/2007 | Archambault et al. | 711/137 |
| 2007/0250666 A1 * | 10/2007 | Sartorius et al. | 711/133 |
| 2008/0052499 A1 * | 2/2008 | Koc | 712/238 |
| 2009/0089564 A1 * | 4/2009 | Brickell et al. | 712/239 |
| 2009/0313462 A1 | 12/2009 | Emma et al. | |
| 2010/0287385 A1 | 11/2010 | Conte et al. | |

OTHER PUBLICATIONS

IBM TDB (Tying Data Prefetching to Branch Prediction); TDB-ACC-No. NN931069; IBM Technical Disclosure Bulletin, Oct. 1993, US; vol. 36, Issue 10, pp. 69-70, Oct. 1, 1993; 2 pages.*
Anderson et al. (Pentium Processor System Architecture) Second Edition; 1995; 5 total pages attached.*
Philip G. Emma et al., pending U.S. Appl. No. 12/721,933 entitled "Prefetching Branch Prediction Mechanisims," filed with the U.S. Patent and Trademark Office on May 11, 2010.
Emma et al., pending U.S. Appl. No. 12/721,933 entitled "Prefetching Branch Prediction Mechanisims," filed with the U.S. Patent and Trademark Office on May 11, 2010.
Office Action—Non-Final for U.S. Appl. No. 12/721,933, filed Mar. 11, 2010; First Named Inventor: Philip G. Emma; dated Sep. 5, 2012.
Philip G. Emma et al., pending U.S. Appl. No. 12/721,933 entitled "Prefetching Branch Prediction Mechanisims," filed with the U.S. Patent and Trademark Office on Mar. 11, 2010.

* cited by examiner

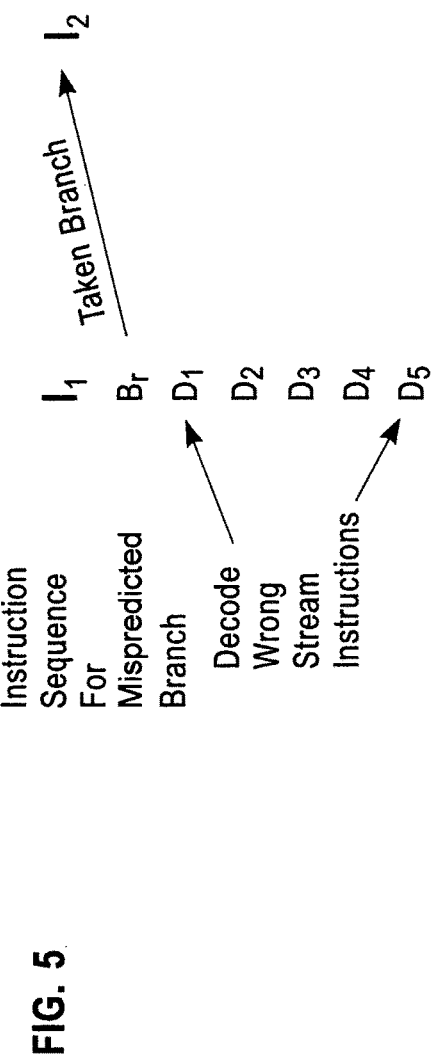
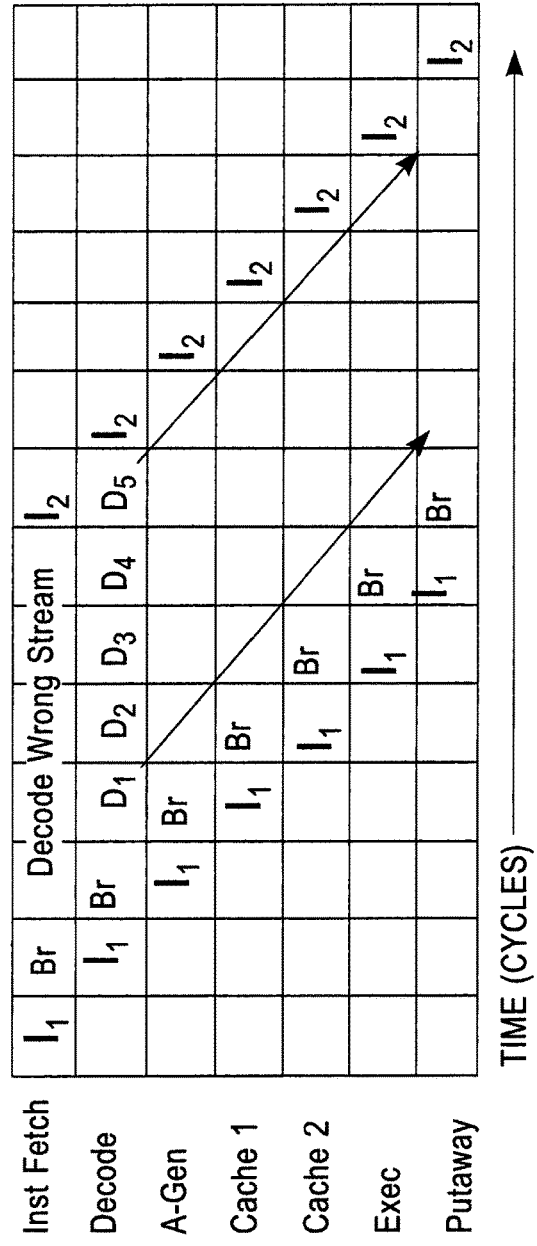
FIG. 5

Branch Wrong Guess

End Branch Wrong Guess

Invalidate Branch Prediction Entry

BRANCH PREDICTION PATH WRONG GUESS INSTRUCTION

BACKGROUND

The embodiments relate generally to computer processing techniques and, more particularly, to methods involving branch prediction in computer processing.

DESCRIPTION OF BACKGROUND

Prefetching in processors is a technique that is commonly used to reduce the delays caused by cache misses. Prefetching is also used to load the branch prediction mechanism with upcoming branch information. Each prefetching mechanism attempts to anticipate which sections of memory or branches will be used by a program and fetch them into the cache or branch predictor before the processor would normally request them.

A commonly used prefetching technique involves inserting prefetching instructions into a program. Many processors include a Data-Cache-Block-Touch (DCBT) instruction that prefetches a line of memory into the cache. A compiler (that may use static and/or dynamic complication techniques) or a programmer may insert these prefetching instructions (referred to below as a touch instruction) in the program ahead of the actual use in an attempt to assure that the data will be in the cache. Touch instructions may be used to prefetch instructions or data. Similarly, branch-prefetching instructions can be use to prefetch upcoming branch information into a branch prediction mechanism.

Large amounts of data or branch information often need to be prefetched when a program is executed for the first time. A programmer may insert many instructions to prime the cache and branch prediction mechanism with information used to efficiently execute the program. However, once this information is in the cache, re-executing the prefetching instructions is unnecessary, or even harmful to the performance of a program.

An economical and efficient mechanism to control the execution of prefetching instructions is desired.

SUMMARY

The shortcomings of the prior art are overcome and additional advantages are achieved through an exemplary method for branch prediction, the method comprising, receiving a branch wrong guess instruction having a branch wrong guess instruction address and data including an opcode and a branch target address, determining whether the branch wrong guess instruction was predicted by a branch prediction mechanism, sending the branch wrong guess instruction to an execution unit responsive to determining that the branch wrong guess instruction was predicted by the branch prediction mechanism, and receiving and decoding instructions at the branch target address.

An alternate exemplary method for branch prediction, the method comprising, receiving an end branch wrong guess instruction having an end branch wrong guess instruction address and data including an opcode, a branch wrong guess address and a branch target address, decoding the end branch wrong guess instruction, determining whether a decoder is decoding an instruction down a wrong branch in a state invariant region, restarting an instruction pipeline, ending the state invariant region, and receiving and decoding instructions at the branch target address responsive determining that the decoder is decoding an instruction down a wrong branch in a state invariant region.

Another alternate exemplary method for branch prediction, the method comprising, receiving an invalidate branch prediction entry instruction having a branch prediction entry instruction address and data including an opcode, a branch address and a branch target address, sending the branch address and the branch target address to a branch prediction mechanism, determining whether the branch address and the branch target address are present in the branch prediction mechanism, deleting the branch address and the branch target address from the branch prediction mechanism responsive to determining that the branch address and the branch target address are present in the branch prediction mechanism.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIGS. 4-8 illustrate the interactions between branch prediction, instruction fetching, and the decoder.

The detailed description explains the preferred embodiments of the invention, together with advantages and features, by way of example with reference to the drawings.

DETAILED DESCRIPTION

Figure 1:
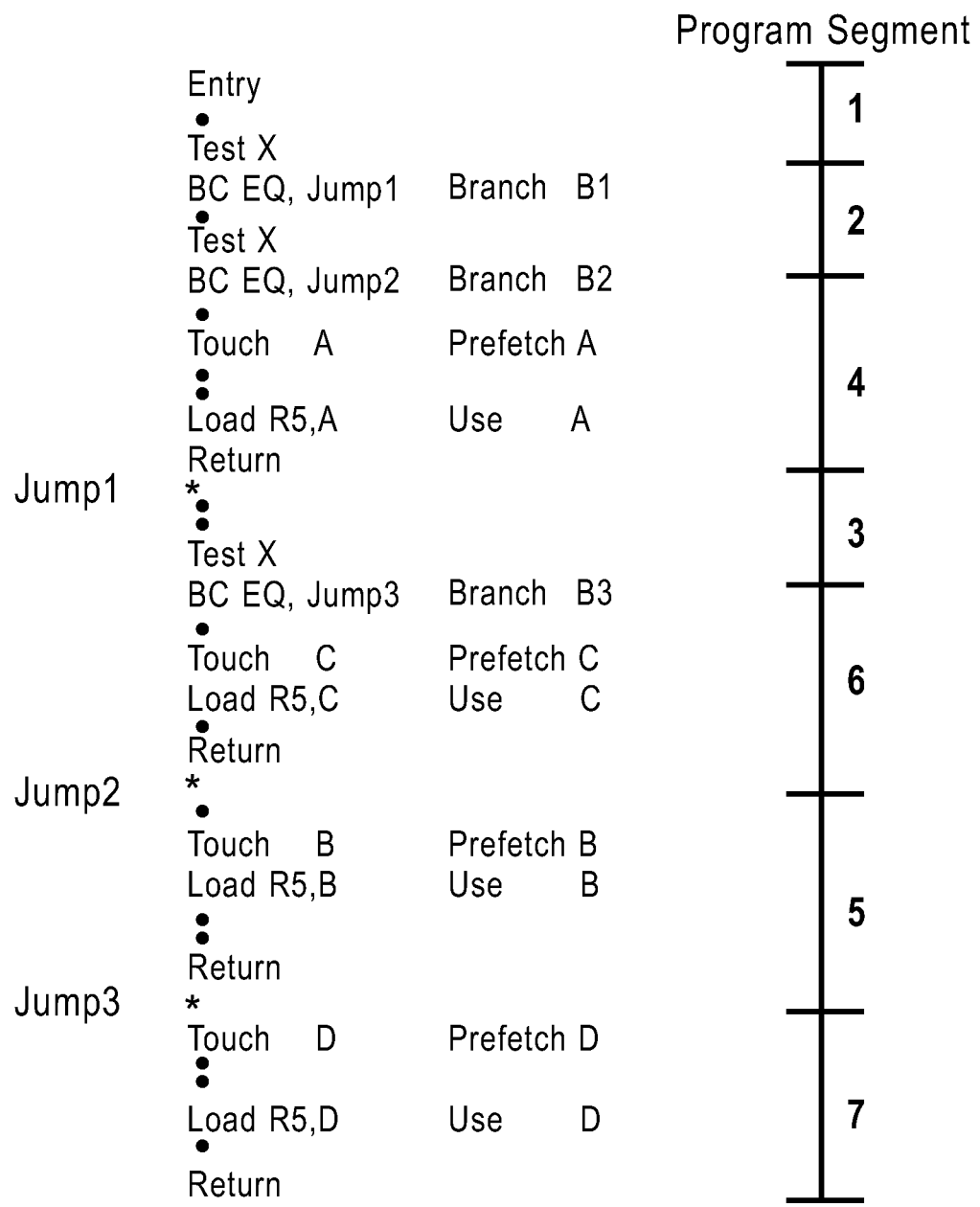
FIG. 1 illustrates an example program containing three branches and four touch instructions.
Figure 2:
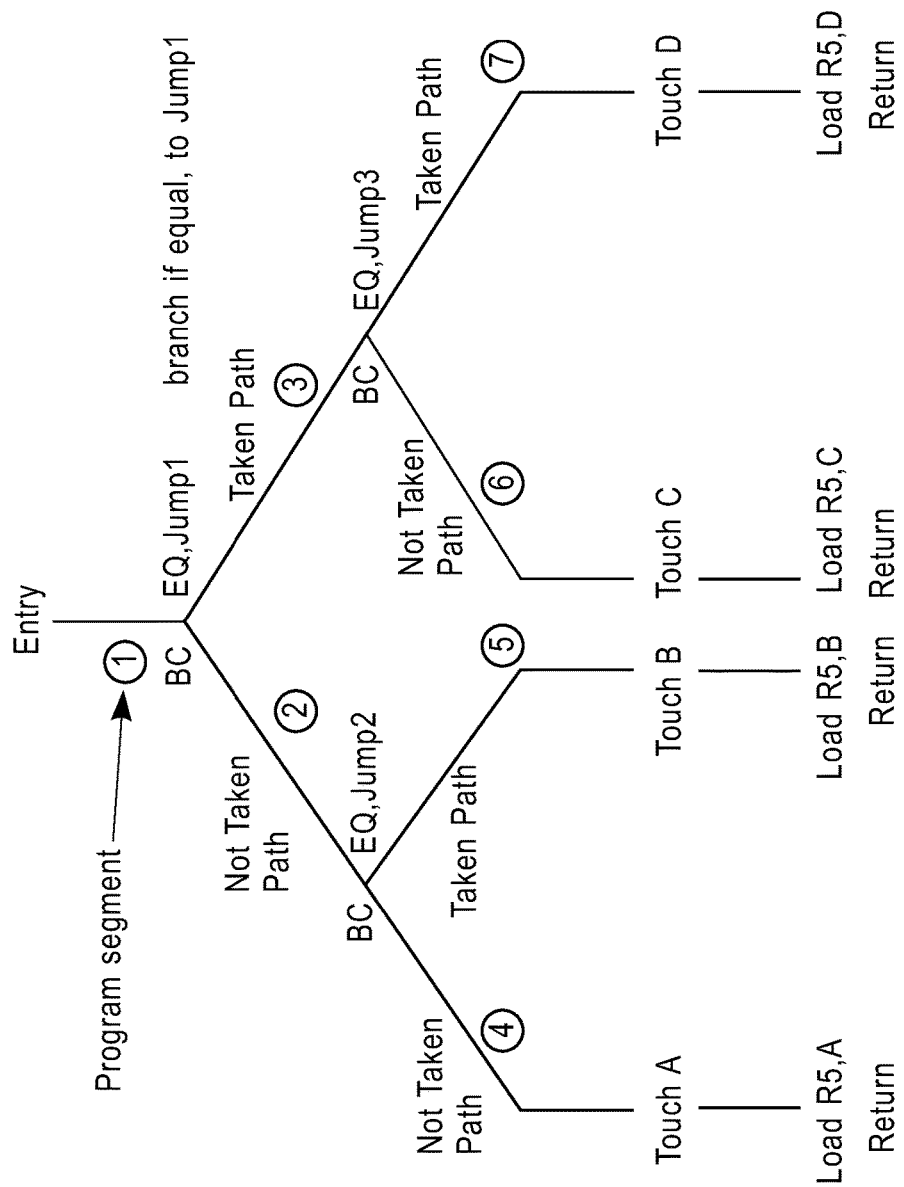
FIG. 2 illustrates an example of a tree graph for the program illustrated in FIG. 1.

FIG. 1 illustrates an example program containing three branches and four touch instructions. The three branches break the program into seven program segments. The three branches are numbered B1, B2, and B3 and identify branches 'BC EQ Jump1', 'BC EQ Jump2', and 'BC EQ Jump3' respectively. The numbering scheme used for the seven program segments is shown in FIG. 2. There are four touch instructions that prefetch data items A, B, C, and D in the program. Following each touch instruction is a corresponding Load instruction that loads information contained in data items A, B, C, or D into a register 5. The data locations for A, B, C, and D are not shown.

FIG. 2 illustrates an example of a tree graph for the program illustrated in FIG. 1. The three branches divide the program into seven program segments. Each program segment is numbered and placed inside a circle. The not-taken path for each branch is shown as the left edge of a tree fork and the taken path is the right edge. The four Load instructions are located in the four leaf segments of the tree, program segments 4, 5, 6, and 7, respectively. The four touch instructions, prefetch locations A, B, C, and D are also located in program segments 4, 5, 6, and 7, respectively, but occur ahead of their load instruction counterparts.

In order to increase the amount of time between the prefetch instructions and the subsequent use of the data by the load instructions (to increase timeliness), the compiler will try to move or "percolate up" the touch instructions in the program. This technique is commonly known as code migration. However, increasing prefetch timeliness through code migration also has certain risks, and these risks can degrade performance. Two of the most common risks are: (1) unnecessary or unused prefetches and (2) redundant re-execution of migrated code.

A general description of risk 1 and method for avoiding the risk is explained as a prelude to explaining risk 2. The embodiments described below provide a simple and efficient mechanism that dynamically determines the recency of execution of a program segment and avoid the redundant re-execution of the segments even though surrounding portions of the program are re-executed repeatedly.

To illustrate the risks, consider the program control flow graph shown in FIG. 2. If the compiler moves the touch instruction for datum A found in program segment 4 into segment 2 (to increase the amount of time between prefetching the item and its subsequent use) then it is, in effect, attempting to predict the outcome of the branch B2 (BC EQ Jump2), either taken or not-taken. In this case, the compiler is assuming that branch B2 is not-taken. If the actual execution flow of the program is from segment 2 to segment 5, because the branch is taken, then datum item A is prefetched and not used.

Similarly, the compiler may move both touch instructions, for data items A and B, into program segment 2. Now, segment 2 will prefetch both A and B. However, depending on the outcome of the branch, only one prefetch will be used. If the branch is not-taken, then the prefetch for A was correct and the prefetch for B was not used. If the branch is taken, then B is used and A is not used.

Figure 3:
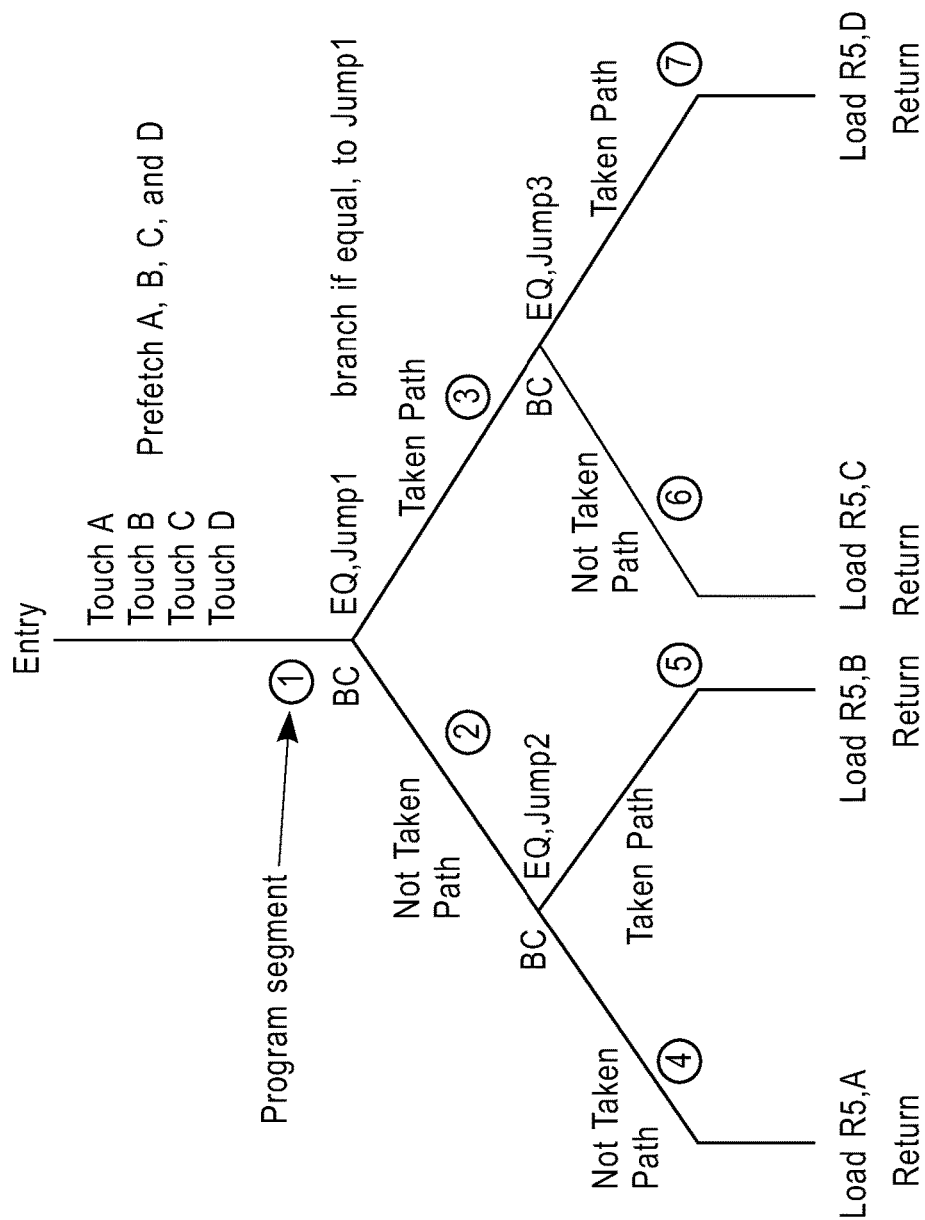
FIG. 3 illustrates an example of a tree graph for the program similar to the tree graph in FIG. 2.

FIG. 3 illustrates an example of a tree graph for the program similar to the tree graph in FIG. 2. In FIG. 3, all four touch instructions (for A, B, C, and D) are moved into program segment 1. It is desirable to only execute the prefetch instructions that produce useful prefetches. In the illustrated example it appears that all four touch instructions will be executed each time program segment 1 is executed, however only one prefetch will produce a useful prefetch.

To avoid issuing unused prefetches (risk 1), it is common for a processor to employ a history based mechanism. U.S. Pat. No. 6,055,621 describes a method that efficiently predicts, with a high degree of accuracy, the usage of prefetched information. The mechanism uses a history table that records whether a previously executed prefetch instruction fetched information that was actually used by the processor. The table is called a Touch-History-Table. Information contained in the table is used to execute only those prefetch instructions that fetched useful data and discard (not execute) prefetch instructions that fetched unused data. This avoids executing prefetch instructions that are not useful.

An example of risk 2, redundant re-execution of migrated code, is described below. Again, consider the compiler moving all four touch instructions into program segment 1 as shown in FIG. 3. Also, let the program be called (executed) three times, each in rapid succession. The first time the program is called, execution begins at program 'entry' and proceeds to segment 1 where the four touch instructions are (selectively) executed. Data are prefetched and execution proceeds to one of the four load instructions in the leaf nodes of the graph.

The next two times the program is called, execution again starts at program entry, proceeds to segment 1 and attempts to prefetch the same data items as before. If the time between program executions is short, and each prefetch accesses the same cache lines as before, there is a high probability that the data are still in the cache and re-executing the prefetches is superfluous.

There are several reasons why the re-execution of these prefetch instructions should be avoided. First, they can degrade performance. Prefetching data that is already in the cache wastes valuable decode and execution cycles, delaying the execution of useful instructions. Second, decoding superfluous instructions increases power while decreasing performance; both are unwanted in a processor. Third, each prefetch instruction must send a request to the cache to determine hit-or-miss status. Typically each prefetch request occupies a cache directory cycle, possibly blocking a demand fetch made by the processor. Fourth, the number of prefetch instructions inserted by the compiler may be large, taking several cycles to decode and execute. Decoding large numbers of touch instructions that prefetch data already in the cache only wastes cycles and decrease performance.

The computations performed by the program are the same regardless of whether the touch instructions are executed. Consequently, the touch instructions define a State-Invariant-Region (SIR) of a program that contains instructions that do not change architected state, but can (if executed) improve or degrade performance. They improve performance if the prefetches are correct and used. They degrade performance if the prefetches are already in the cache (or not used). Thus, it is desirable to execute the touch instructions the first time the program is executed and avoid (branch over) these instructions the second and third time the program is executed or as long as the items touched are still in the cache.

There are several types of instructions a programmer or compiler may place in a program's SIR. For example, instructions can attempt prefetches for all levels of the memory hierarchy (e.g. Cache, L2, L3 . . . ), or the Translation-Lookaside-Buffer (TLB). Additionally, prefetches can be made for the branch prediction mechanism. Future branch information is loaded into the branch prediction mechanism ahead of its use to avoid the potential of a branch prediction error. None of these instructions change architected state of the processor but can improve performance if successful, or degrade performance if executed unnecessarily. Other types of instructions placed in the SIR are power management or pipeline reconfiguration.

The programmer may turn the floating point, or decimal units on or off, depending on usage, or issue instructions to change frequency, voltage or pipeline length.

Two other features are associated with placing instructions in a program's SIR. First, the instructions in the SIR may be executed out-of-order (since they do not change state), even in an in-order machine. They do not have to pass through the processor's pipeline, but can be executed immediately by the decoder after decode. This allows the processor to achieve a greater degree of execution parallelism than passing all instructions through to the execution unit for execution. Even in out-of-order machines these instructions may be executed immediately and do not have to wait for a final commit or completion stage of a pipeline.

Second, the execution of the instructions in the SIR is conditional. There is benefit if they prefetch data that is not in the cache (and used), the instructions waste cycles (time) if they prefetch data already in the cache or prefetch data not used. Consequently, it is desirable to tie the execution to the contents of the cache (or branch prediction mechanism). The instructions should be executed if there is a high degree of probability that the items prefetched are not in the cache. The instructions should not be executed if there is a high probability the items are already in the cache.

The embodiments described below establish a state-invariant-region of a program that does not change architected state in a processor, but change the contents of the cache, branch prediction mechanism, power management, pipeline configuration or other structures of the processor. Additionally, the mechanism provides a link between the branch prediction mechanism, cache contents, and instruction set architecture (ISA) that can determine whether the instructions should be executed. These objectives are achieved by providing three new instructions: Branch Wrong Guess (BWG), End Branch Wrong Guess (EBWG), and Invalidate Branch Prediction Entry (IBPE).

The Branch Wrong Guess instruction is a branch that can intentionally introduce a branch prediction error into the pipeline. The format of the branch is similar to that of a normal branch, with opcode and target address fields (jump to address). However it is intentionally guessed (at decode time) as not-taken, but is always taken at execution time. This forces the decoder to begin to decode down the wrong stream. The instructions following the BWG represent the SIR and cannot change state.

The End Branch Wrong Guess instruction is the last instruction found in the SIR and terminates decoding down the wrong stream. The decoder will immediately switch to the correct stream (the target of the BWG instruction) and begin decoding down that stream. This may occur before the Branch Wrong Guess instruction is even executed. This feature allows a programmer to intentionally introduce a branch prediction error into a pipeline, decode and execute the instructions in the SIR, and switch back to the correct stream, without introducing a pipeline bubble.

The Invalidate Branch Prediction Entry (IBPE) removes branch information from the branch prediction mechanism. Consequently, this can cause a prediction error to occur the next time the branch is encountered. Typically, branch prediction occurs during the instruction fetching phase of a processor. If branch prediction is working properly, the instruction fetching process will seamlessly fetch jumps in the instruction stream (if the branch is taken), or fetch the fall through path if the branch is not taken. Branch prediction errors usually cause the pipeline to be flushed and instruction fetching to restart at the instruction that logically follows the branch.

Typically, a prediction mechanism saves the branch address and target address of each branch encountered by the processor in a table, called a branch history table (BHT). During the instruction fetching phase of a processor, the BHT is searched for a matching branch address contained in the instruction fetch address, and if found, its target becomes the next instruction address fetched and the instruction located at this address becomes the next instruction decoded. If the branch is not in the BHT, it is assumed that the branch is not taken and the next address fetched is the fall through address. U.S. Pat. No. 4,679,141 describes such a method.

Figure 4:
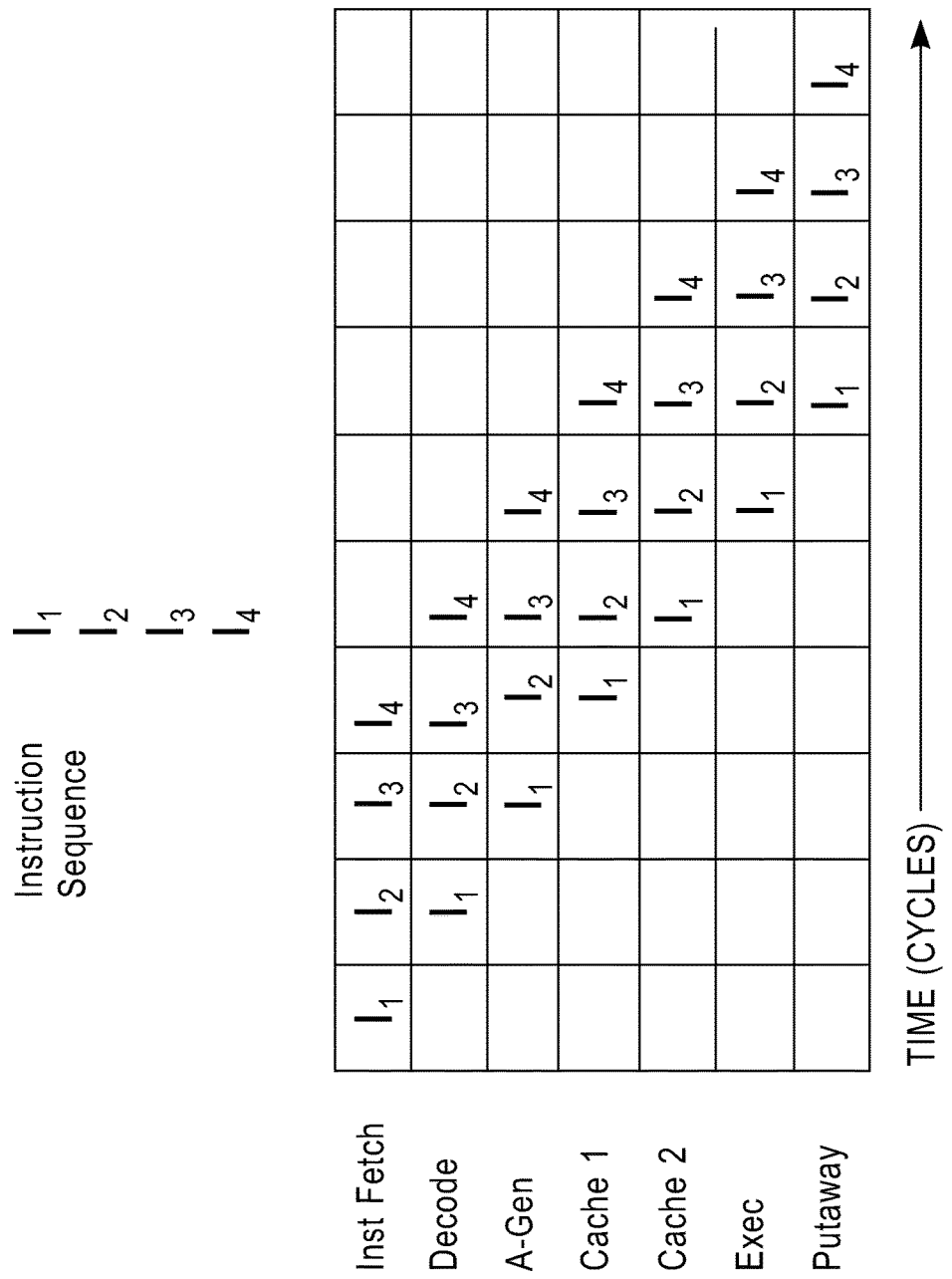

FIGS. 4-8 illustrate the interactions between branch prediction, instruction fetching, and the decoder are illustrated. Computer designers have used pipelining as a means of improving the performance of modern computers. Pipelining allows the designer to partition the computer into separate components where each component is responsible for completing a different phase of an instruction's execution. For example, FIG. 4 shows four instructions, $I_1$, $I_2$, $I_3$, and $I_4$ passing through a pipeline consisting of the following phases: Instruction Fetch (Inst-Fetch), Decode, Address Generation (A-GEN), a two cycle Cache Access (cache 1, and cache 2), Execution, and Putaway (store the results).

Each instruction enters a pipeline at the decoder and spends one cycle in each of the pipeline stages. Individually, each instruction takes seven pipeline cycles to complete. However, if the pipeline can be kept full then each component of the processor (decoder, execution unit, cache) can be kept actively working on a different instruction, each at a different pipeline stage, and one instruction will complete on every cycle. Notice that instruction $I_2$ can even be a taken branch ($I_2$ branches to $I_3$), but as long as the instruction fetching mechanism (working in conjunction with the branch prediction mechanism), predicts the branch, instruction fetching can seamlessly fetch the discontinuity between $I_2$ and $I_3$ and avoid a pipeline delay. Unfortunately, keeping the pipeline full is not an easy task. Branch prediction errors do occur and often disrupt the pipeline, and cause delays or pipeline bubbles that reduce the overall processing potential of a pipeline.

FIG. 5 illustrates a pipeline disruption typical of a branch prediction error. FIG. 5 includes eight instructions: $I_1$, a taken branch (Br) that is mispredicted, and $I_2$ (the target of the branch) as they pass through the pipeline. Instructions $D_1$, D2, D3, $D_4$, and D5 represent the instructions immediately following the branch, (the fall through path). The branch Br is guessed as not-taken, but is taken; thus the branch prediction error. Each instruction ($D_1$ through $D_5$) takes a decode cycle and illustrate the amount of time the decoder spends decoding down the wrong path. This is represented by a five cycle gap between decoding instructions Br and $I_2$. Once the branch is executed, the processor determines a prediction error has occurred and the correct stream ($I_2$) is fetched and normal processing of the instructions can continue.

Figure 6:
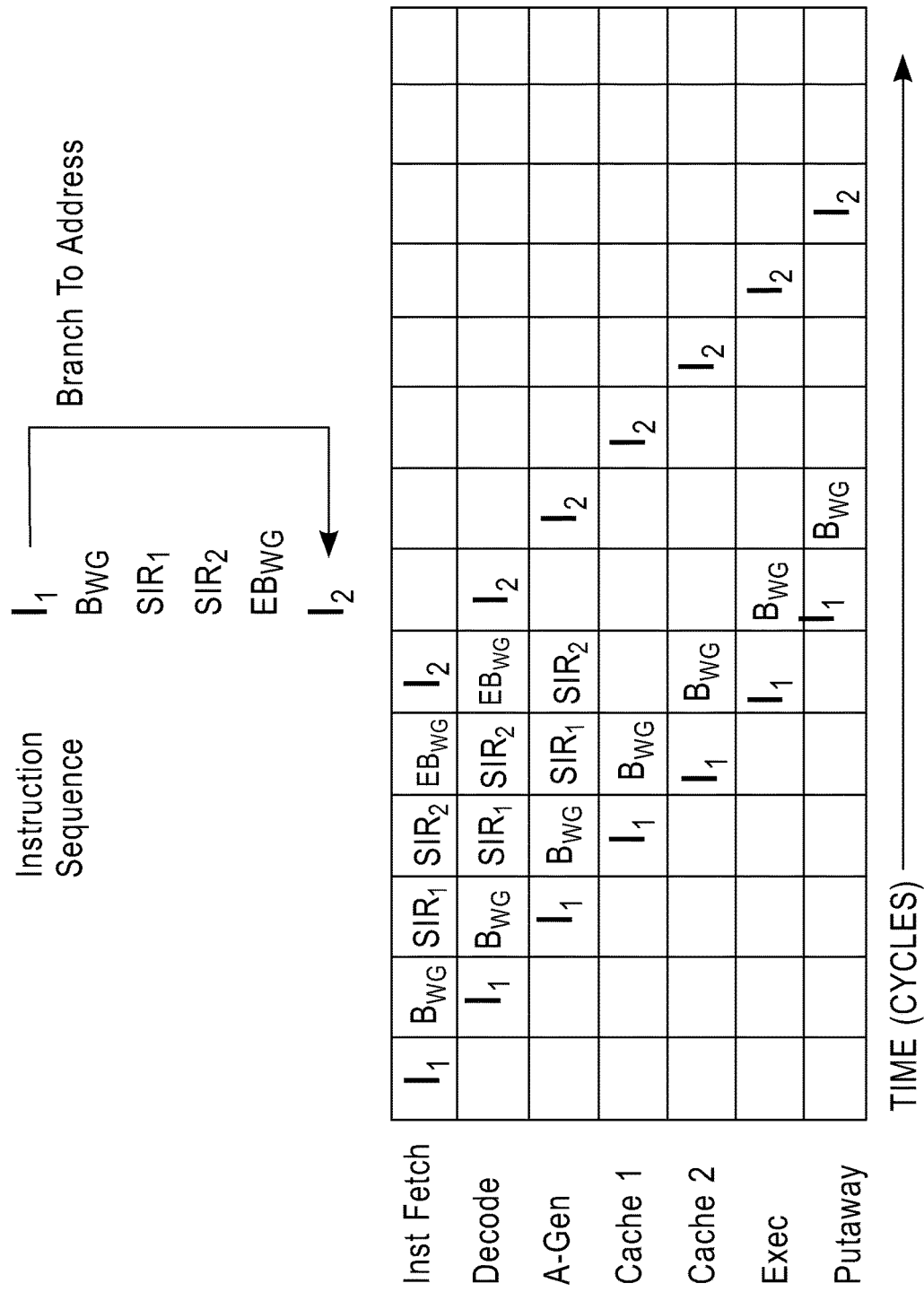

Now consider the pipeline flow associated with processing a Branch-Wrong-Guess instruction for the first time. Typically this produces a branch prediction error. FIG. 6 shows five instructions: $I_1$, BWG (the Branch Wrong Guess instruction), SIR1 and SIR2 (the decode wrong stream instructions; these represent a two instruction state-invariant-region), EBWG (End branch wrong guess), and $I_2$. The gap between decoding and executing BWG and $I_2$ is three cycles. However, during this time, the two SIR instructions are decoded and executed, overlapping useful work while the BWG instruction passes through the pipeline. The target of the BWG ($I_2$) is fetched immediately after the decode cycle, and decode can proceed down the correct path immediately after the EBWG is decode. The instructions in the SIR (SIR1 and SIR2) can prefetch information to the cache, branch prediction mechanism, TLB, or be any non-state changing instruction.

Figure 7:
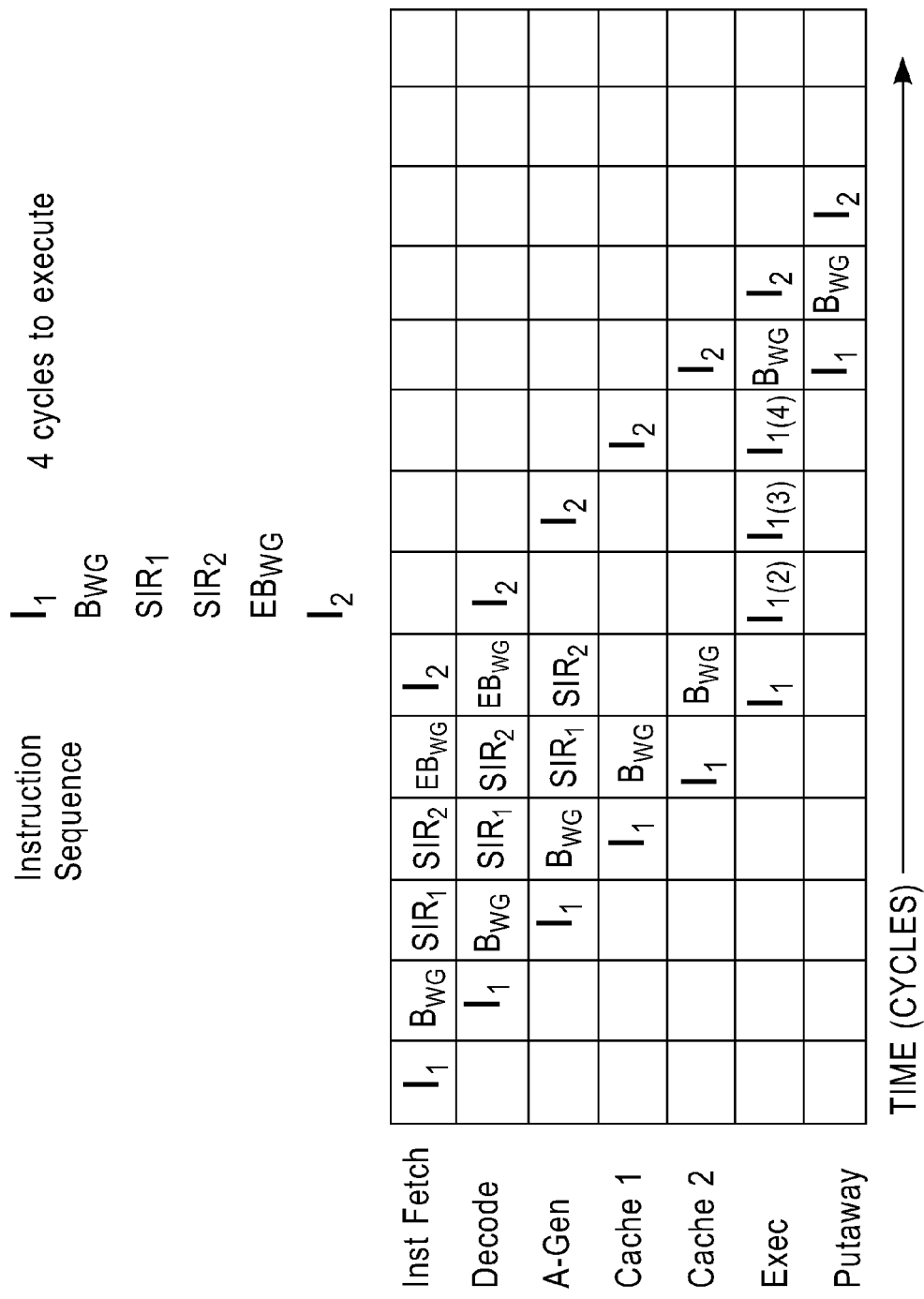

The illustration above shows three idle cycles between execution of the BWG and $I_2$ instructions. Normally, this occurs when each instruction takes one cycle to execute, but consider the pipeline flow if $I_1$ is a multi-cycle execution instruction. FIG. 7 illustrates a similar instruction sequence that uses four cycles to execute $I_1$. Now, the execution unit is kept totally busy doing useful work, there are no idle cycles. The decoder was able to decode the BWG instruction, the two SIR instructions, the EBWG instruction, and finally switch to the correct stream (instruction $I_2$) without introducing any execution unit idle (stall) cycles into the pipeline. Thus, no time is lost due to intentionally introducing a BWG instruction into the pipeline.

Figure 8:
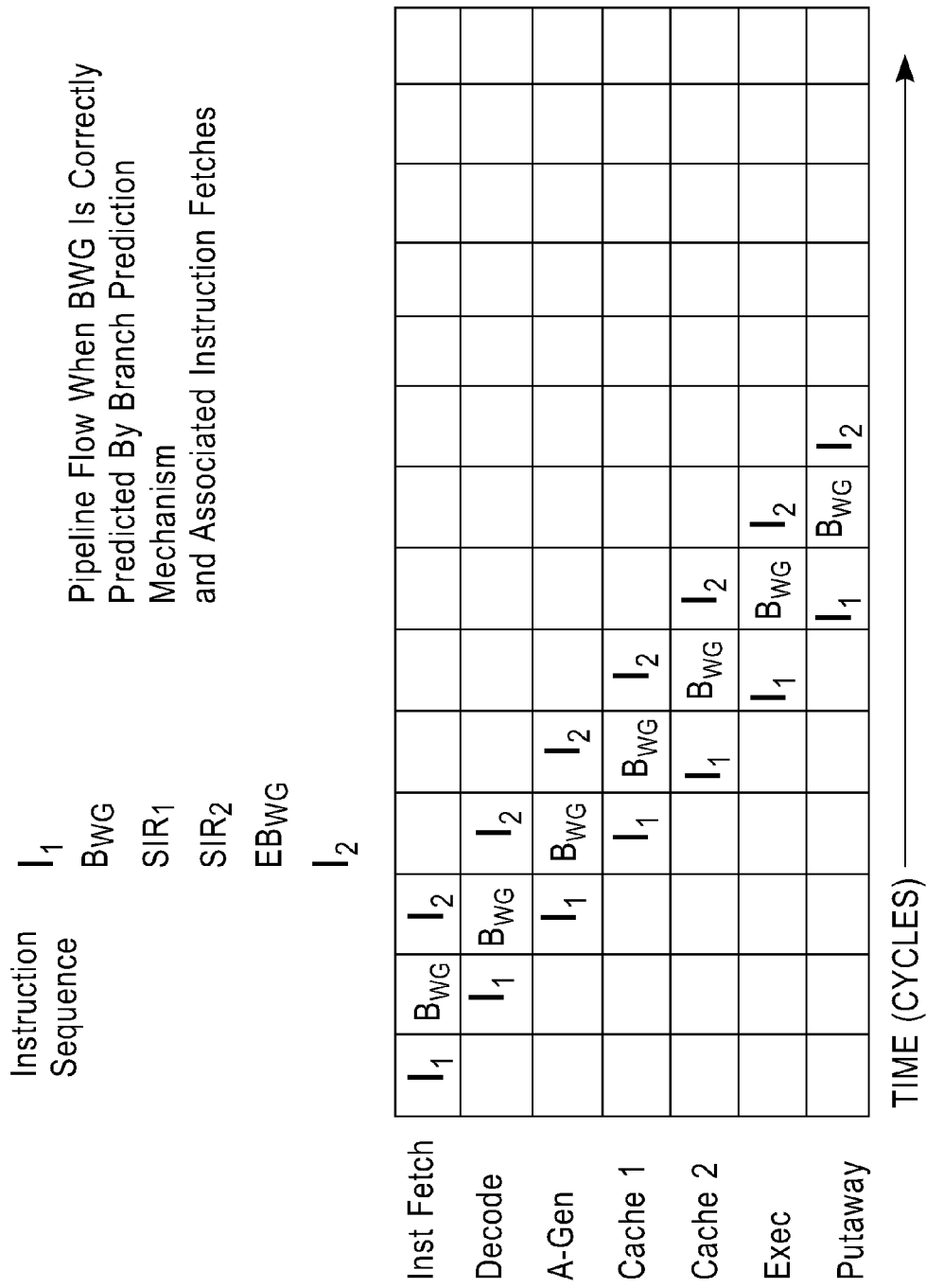

FIG. 8 illustrates the execution flow when the same set of instructions is executed and the BWG is correctly predicted. When the program is executed the first time, the BWG information (branch address and target address and action) is placed in the BHT. If the program is called again (a second and third time), branch prediction and instruction fetching will detect the BWG and fetch the discontinuity (ump) between the BWG and $I_2$, thus avoiding the instructions in the SIR.

The entry point (called the prologue) of any program may be used to specify a state-invariant-region. During program entry, the instructions in a SIR can prime the caches and branch prediction mechanism with upcoming data and branch information. Typically, the prologue of a program contains several multi-cycle instructions. By convention, these instructions are used to establish program linkage. It is common for a processor to use Store and Load Multiple instructions to save register values of the calling program, then load new register values in the called program. The storing and subsequent loading of registers can require 32 to 64 registers to be saved and restored and can take many more cycles than shown in the example above. The BWG instruction may follow one of the multi-cycle instructions found in a program's prologue. Thus, it is possible to process the BGW instruction, instructions found in the SIR, the EBWG instruction, switch to the correct stream, and still not introduce any idle cycles (a bubble) in the pipeline.

The figures above illustrate the desired execution sequence of the present invention. The BWG acts as a 'guard' for the instructions that follow in the SIR. These instructions are decoded and executed the first time the program is entered because the branch prediction mechanism did not detect the branch. Thus, there is a high probability that the instructions in the SIR will provide useful work (prefetch data, prefetch branch information, save power, or improve execution).

Once the program is executed, the branch prediction mechanism contains the BWG, and subsequent re-executions of the program will avoid (jump over) the instructions in the SIR. In the examples presented above, the residency of the BWG instruction in the branch prediction mechanism acts as a proxy for determining the residency of a prefetch being in the cache. That is, if the branch is still in the BHT, there is a high probability that the data from the touch and load instructions are still in the cache. This relationship is even stronger if the instructions in the SIR are loading (prefetching) branch information. If the BWG is still in the BHT, then there is a high probability that any branch information prefetched from the SIR is still in the BHT.

The design description for the described embodiments is chosen for simplicity of exposition rather than optimality of design. For example, it is assumed that all instructions are executed in-order, and one-at-a-time, however out of order, superscalar and multiprocessor designs are not precluded from the description presented. It should be readily understood by those skilled in the art that alternative compilation techniques, pipeline designs, and instruction formats can be used to define, generate, and place the instructions (both cache and branch prediction prefetching, and performance improvement) in the SIR, and the present invention may be used with any alternative techniques.

Figure 9:
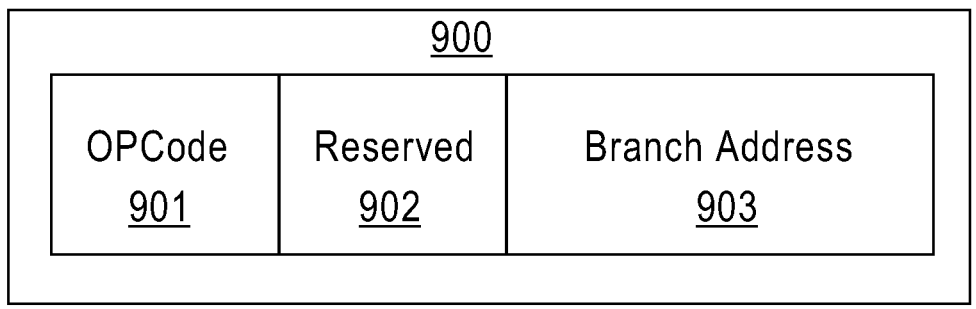
FIG. 9 illustrates an exemplary embodiment of a Branch-Wrong-Guess (BWG) instruction.

FIG. 9 illustrates an exemplary embodiment of a Branch-Wrong-Guess (BWG) instruction 900. If not predicted by the branch prediction mechanism during the instruction fetching phase of the processor, the instruction 900 is predicted as not-taken by the decoder and always taken at execution time. The instruction 900 includes the following fields: An opcode 901 field represents the opcode used by the instruction. A target address 903 field identifies the branch address or target address. The format may represent a base register and displacement value or a relative offset from the BWG instruction. Typically the branch address specifies the instruction following the End-Branch-Wrong-Guess instruction.

If branch prediction is working properly, the BWG will be predicted as taken during the instruction fetching phase of a processor. However, if undetected by the branch predictor, it is guessed as not-taken by the decoder and always taken at execution time, forcing the processor to decode down the wrong instruction stream (the fall through path). The instructions that follow the BWG define a state-invariant-region and cannot change any architected state of the processor. Alternative forms of the BWG instruction may include an address to terminate decoding down the wrong stream. In this form, an instruction field 902 identifies the last instruction down the wrong stream before the decoder switches to the correct stream.

Figure 10:
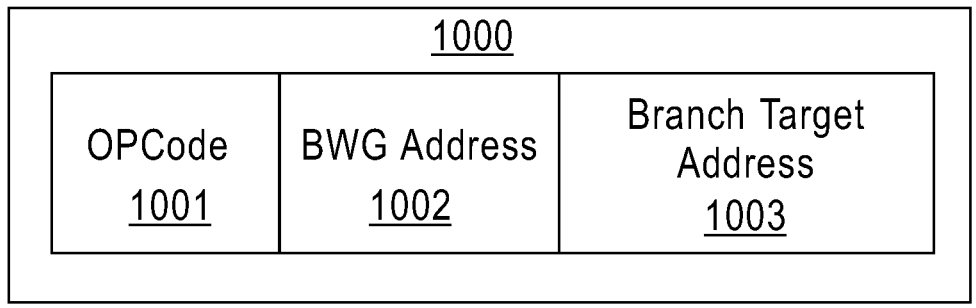
FIG. 10 illustrates an exemplary embodiment of an End-Branch-Wrong-Guess (EBWG) instruction.

FIG. 10 illustrates an exemplary embodiment of an End-Branch-Wrong-Guess (EBWG) instruction 1000. The instruction 1000 terminates decoding down the wrong stream and initiates a pipeline restart. The instruction 1000 includes the following fields: An opcode 1001 field represents the opcode used by the instruction 1000. A BWG address 1002 field identifies the address of the corresponding BWG instruction 900 that initiated the decoder to start decoding down the wrong stream. The format for the BWG address 1002 field may represent a base register and displacement value or a relative offset from the EBWG instruction. A target address 1003 field identifies the target address from the corresponding BWG instruction 900 that started the decoder to begin decoding down the wrong stream. Typically the branch address specifies the instruction following the End-Branch-Wrong-Guess instruction 1000 and denotes the first instruction following the SIR.

Figure 11:
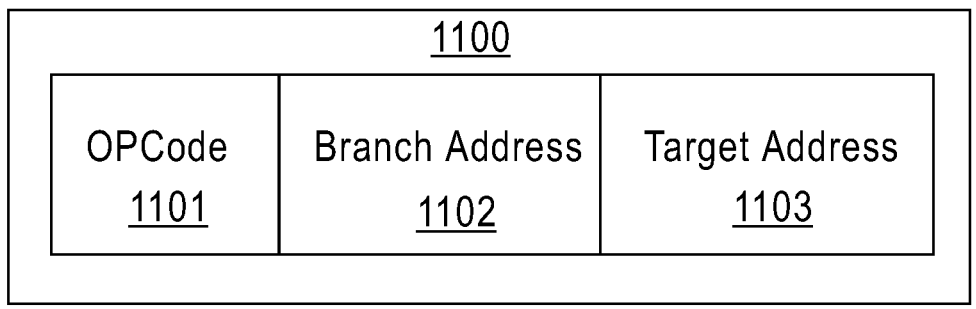
FIG. 11 illustrates an exemplary embodiment of an Invalidate-Branch-Prediction-Entry (IBPE) instruction.

FIG. 11 illustrates an exemplary embodiment of an Invalidate-Branch-Prediction-Entry (IBPE) instruction 1100. The instruction 1100 identifies a previously encountered branch and removes any branch prediction information from the branch predictor. The instruction 1100 includes the following fields: An opcode 1101 field represents the opcode used by the instruction. A branch address 1102 field identifies the address of the branch instruction to be removed from the branch predictor. The format for this field may represent a base register and displacement value or a relative offset from the IBPE instruction. A target address 1103 field identifies the target address of the corresponding branch instruction to be removed from the branch predictor. The format for the target address 1103 field may represent a base register and displacement value or a relative offset from the IBPE instruction. Typically the branch and target address are used as an address pair to identify a corresponding branch and target address contained in the branch predictor. Branch information from the matching address pair is removed from the branch predictor, typically causing the branch to be mispredicted the next time it is encountered by the processor.

Figure 12:
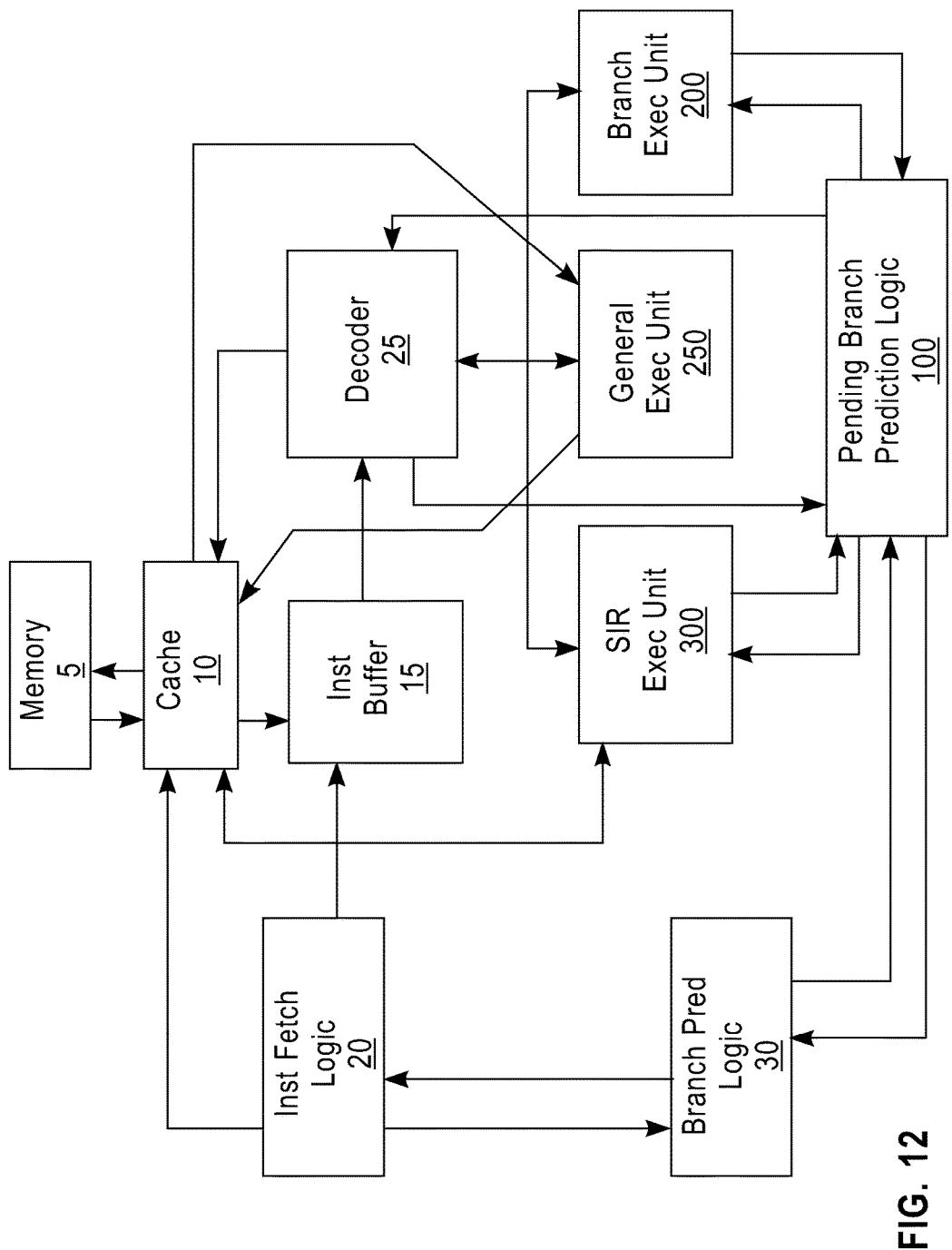
FIG. 12 illustrates elements of an exemplary embodiment of a computer system.

The interactions between branch prediction, instruction fetching, and the decoder are described below. FIG. 12 illustrates elements of an exemplary embodiment of a computer system. FIG. 12 includes a memory 5 communicatively connected to a cache 10. The cache 10 is communicatively connected to an instruction buffer 15, instruction fetch logic 20, decoder 25, a SIR execution unit 300, and a general execution unit 250. A decoder 25 is communicatively connected to the instruction buffer 15, the general execution unit 250, SIR execution unit 300, branch execution unit 200, cache 10, and pending branch prediction logic 100. A branch execution unit 200 is communicatively connected to the pending branch prediction logic 100 and the SIR execution unit 300. A branch prediction logic 30 is communicatively connected to the instruction fetch logic 20, the SIR execution unit 300, and the pending branch prediction logic 100.

In operation, the memory 5 stores instructions and operands for programs executing on the processor. The most recently used portions of memory are transferred to the cache 10. The cache 10 is a high speed memory where instructions and data are saved. The cache 10 supplies the instruction buffer 15 with instructions, the general execution unit 250 with operands, and the SIR execution unit 300 with operands. The cache 10 receives updates (stores), fetch requests, and prefetch requests from the SIR execution unit 300 and general execution unit 250. (A common or unified cache is presented in the illustrated embodiment, however the description could be adapted to split or separate instruction and data caches.) The instruction buffer 15 holds instructions that have been fetched by the instruction fetch logic 20. The instruction fetch logic 20 fetches instructions from the cache 10 and places the instructions in the instruction buffer 15. The instruction fetching controls communicate with the branch prediction mechanism 30 to determine when instruction fetching should proceed along a sequential path of a program or when to jump to a new instruction address due to a predicted branch. Typically, the branch prediction mechanism is far enough ahead of the instruction fetching controls (both in time and branch predictions) that instruction fetching can seamlessly fetch instructions into the instruction buffer 15 without incurring pipeline stalls due to taken branches. The decoder 25 examines the instruction buffer 15 and decodes instructions. Typically, a program counter (PC) exists that contains the address of the instruction being decoded. After an instruction is decoded the instruction is then sent to an appropriate execution unit. Branch instructions, including BWG, EBWG, and IBPE are also sent to the pending branch prediction logic 100 for further processing. Instructions that are decoded while the processor is in the state-invariant-region are immediately executed. The general execution unit 250 executes instructions. A processor may include several branch and general execution units to improve performance and increase parallelism. In the illustrated embodiment, all branches are assigned to the branch execution unit 200 and instructions that do not change state (found in the SIR) are sent to the SIR execution unit 300. All other instructions go to the general execution unit 250. This configuration is chosen for simplicity of design. Many alternate embodiments of execution unit configurations could be used with the described embodiments. Associated with each execution unit is an execution-queue (not shown). The execution queue holds decoded instructions that await execution.

The branch prediction mechanism 30 records branch action information (either taken or not-taken) for previously executed branches. The branch prediction mechanism 30 guides the instruction fetching logic 20 though taken and not-taken branch sequences and receives updates from the branch execution unit 200. The branch prediction logic and instruction fetching logic work with branch prediction running ahead of instruction fetching. The instruction fetching logic 20 uses the branch prediction information to fetch sequential instructions if a branch is not-taken or jump to a new instruction fetch address if a branch is predicted as being taken. The branch prediction mechanism may detect (predict) taken branches early enough in time so that the instruction fetching logic 20 may fetch the branch target before stalls occur in the pipeline. The branch prediction logic 20 functions similarly to the branch history table (BHT) described in U.S. Pat. No. 4,679,141.

Figure 13:
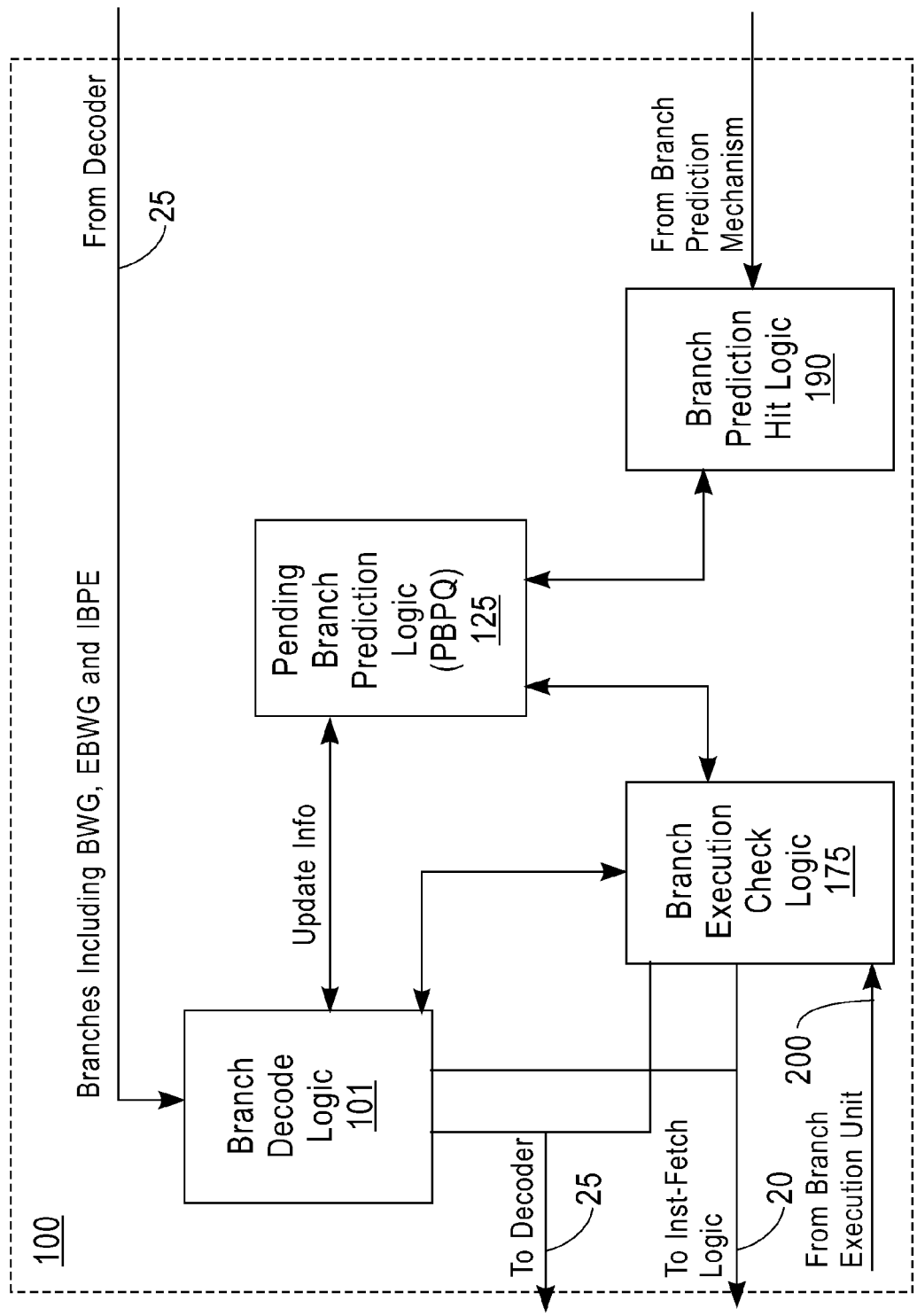
FIG. 13 illustrates a block diagram of an exemplary embodiment of the pending-branch-prediction-logic of FIG. 12.

FIG. 13 illustrates a block diagram of an exemplary embodiment of the pending-branch-prediction-logic 100. The pending branch prediction logic 100 includes four sub units: a pending branch prediction queue (PBPQ) 125, a branch decode logic 101, branch execution check logic 175 and the branch prediction hit logic 190. The PBPQ 125 holds prediction information (branch and target addresses) describing the action of the most recently predicted taken branches. All branches including BWG, EBWG, and IBPE are sent to the branch decode logic 101. The branch decode logic 101 supplies the branch execution unit 200 with the branch prediction information, and resets the decoder 25 and instruction fetch logic 20 with address sequencing information after a decoded branch. The branch execution check logic 175 checks the branch prediction information against the actual execution results of the branch. When prediction errors are detected, the PBPQ 125 is purged, and the instruction fetching logic 20 and decoder 25 are restarted. The branch prediction hit logic 190 saves branch prediction information in the PBPQ 125. The branch prediction information is used by the other sub-units in the pending branch prediction logic 100. The operation of the sub units will be described more fully below. Many of the functions described in the pending branch prediction logic may be integrated in the decoder 25, the branch prediction mechanism, or execution units of a processor. Cycle time constraints may require certain parts of this logic to be placed within the units. However, they are described separately for simplicity of exposition.

Considering the mechanism as three independent but synchronized processes: instruction fetching (including branch prediction), decode, and execution, further operations are described below. The instruction fetching process fetches instructions into the instruction buffer 15 along predicted paths of a program. These paths are based on predictions made by the branch prediction mechanism. When a branch is detected by the branch prediction mechanism, an entry is made in the PBPQ 125. The entry includes saving the branch address, and predicted target address in the PBPQ 125.

Figure 14:
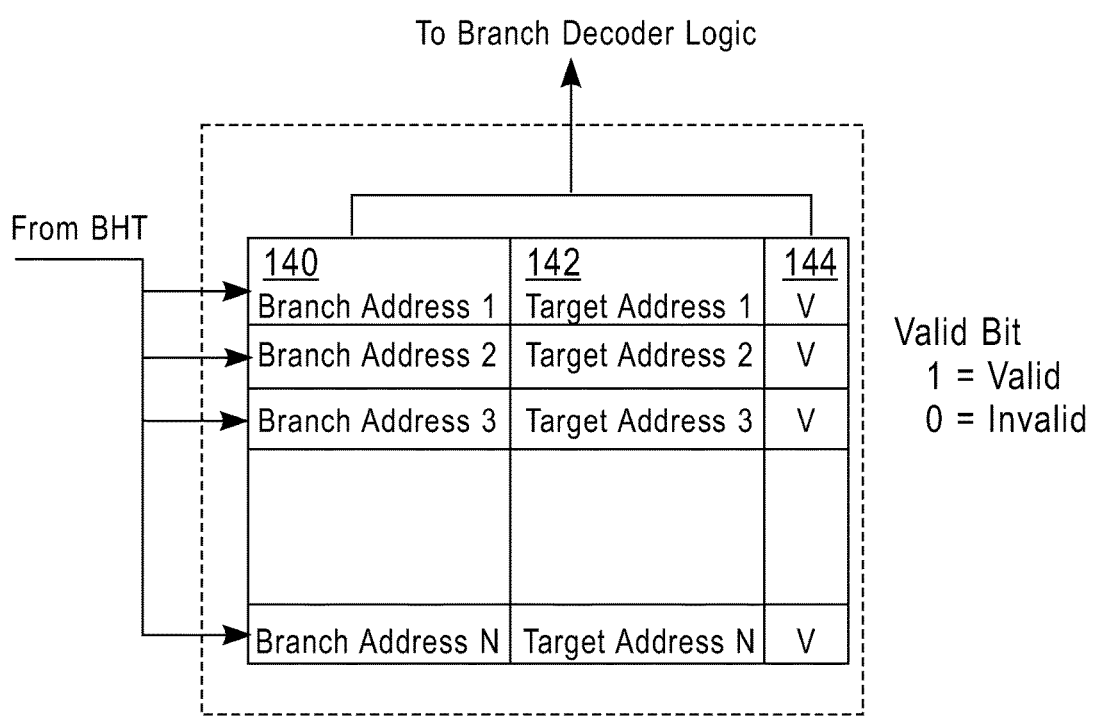
FIG. 14 illustrates an exemplary embodiment of the PBPQ of FIG. 13.

FIG. 14 illustrates an exemplary embodiment of the PBPQ 125 of (FIG. 13). The PBPQ 125 is arranged as an array of entries including a branch address field 140, a target address field 142, and valid bit 144. The branch address information field 140 includes individual branch address entries that identify the address of a branch whose direction was predicted by the branch prediction mechanism. Each address that is saved in the branch address field 140 may be abbreviated or truncated. In some embodiments only a subset of the bits that make up the full branch address in each PBPQ 125 entry are saved. A branch target entry 142 and valid bit 144 are associated with each branch address entry in the PBPQ 125. The branch target field 142 identifies the predicted target address of the corresponding branch identified by the branch address field 140. The valid bit 144 associated with each branch address field indicates if the branch address entry is valid (used) or invalid (not-used). The PBPQ 125 acts as a queue with the first entry (or head) as being the oldest entry. New entries are added to the first available free entry starting from the head of the queue and searching to the end. Entries are removed from the head of the queue and all valid sub-entries are pushed up one position.

Figure 15:
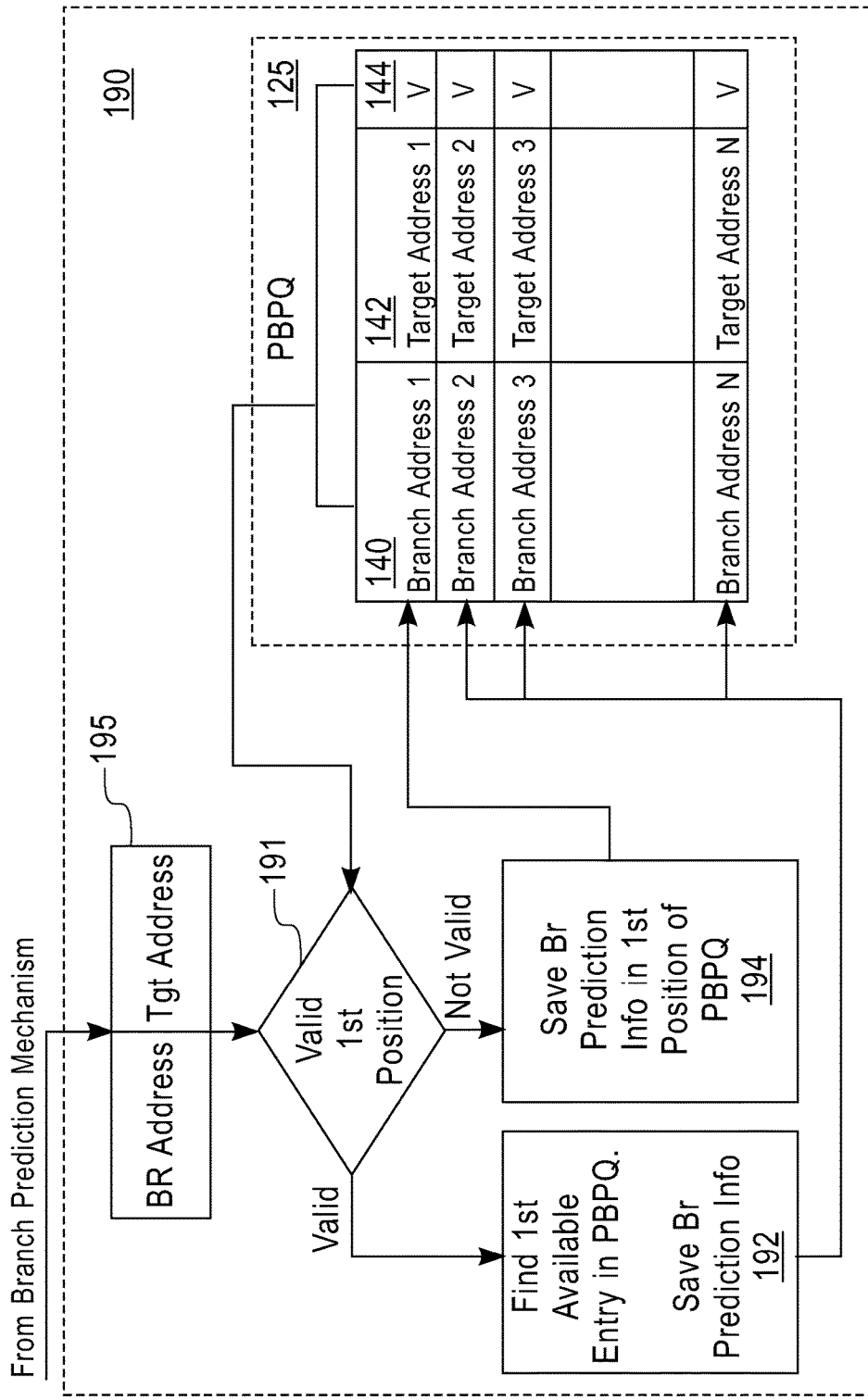
FIG. 15 illustrates a block diagram of an embodiment of the operation of the branch prediction mechanism hit logic of FIG. 13.

FIG. 15 illustrates a block diagram of an embodiment of the operation of the branch prediction mechanism hit logic 190 (of FIG. 13). FIG. 15 illustrates a branch prediction entry 195 supplied by the branch prediction mechanism. Each branch prediction entry includes a branch address, and predicted target address. Valid detect logic 191 determines if the first position of the PBPQ 125 is valid. If the first position is valid (used) then a valid signal is sent to a select logic 192 where the first free (available) position in the PBPQ 125 is found. In the select logic 192, the PBPQ 125 is updated and the branch prediction entry is saved and the valid indicator 144 is set to 1. If the first position of the PBPQ 125 is invalid (not used), select logic 194 is enabled and the branch prediction information is saved in the first position of the PBPQ 125 with the valid bit set.

The instruction fetching mechanism is guided by the predicted branch address information found in the PBPQ 125. Blocks of instructions are fetched and placed in the instruction buffer and each new block of instructions fetched contains the next set of instructions in sequence following the previously fetched block. Each block is aligned on a quad word or double-quad-word (16 or 32 byte boundaries). However, branches in the instruction stream cause breaks in the sequential fetching of instructions and should be detected or predicted by the instruction fetching mechanism. The PBPQ 125 provides the information to guide the instruction fetching controls along sequential paths of a program or across jumps caused by branches.

Jumps in the instruction stream are detected by comparing the instruction fetch address to the predicted branch addresses contained in the PBPQ 125. If a match is found, and the branch is predicted as being taken then the next instruction fetch address will be the predicted target address of the branch found in the PBPQ 125. If a match is not detected, or the branch is predicted as not-taken, the next instruction fetch will be the block of instructions that is sequentially next to the previous block fetched.

If the instruction buffer 15 (of FIG. 12) queue is full then the instruction fetching process waits until a slot becomes available. Slots become available when all of the instructions contained in the block are decoded. The branch prediction process waits when there are no free slots in the PBPQ 125. Slots become available as branches are decoded. The branch execution unit 200 checks the branch prediction when the branch is executed. The prediction information is contained in the decode information that is sent by the decoder 25 to the execution unit 200. If a branch prediction error is detected during instruction execution, all instructions fetched into the instruction buffer following the mispredicted branch and all entries in the PBPQ 125 are discarded.

Figure 16:
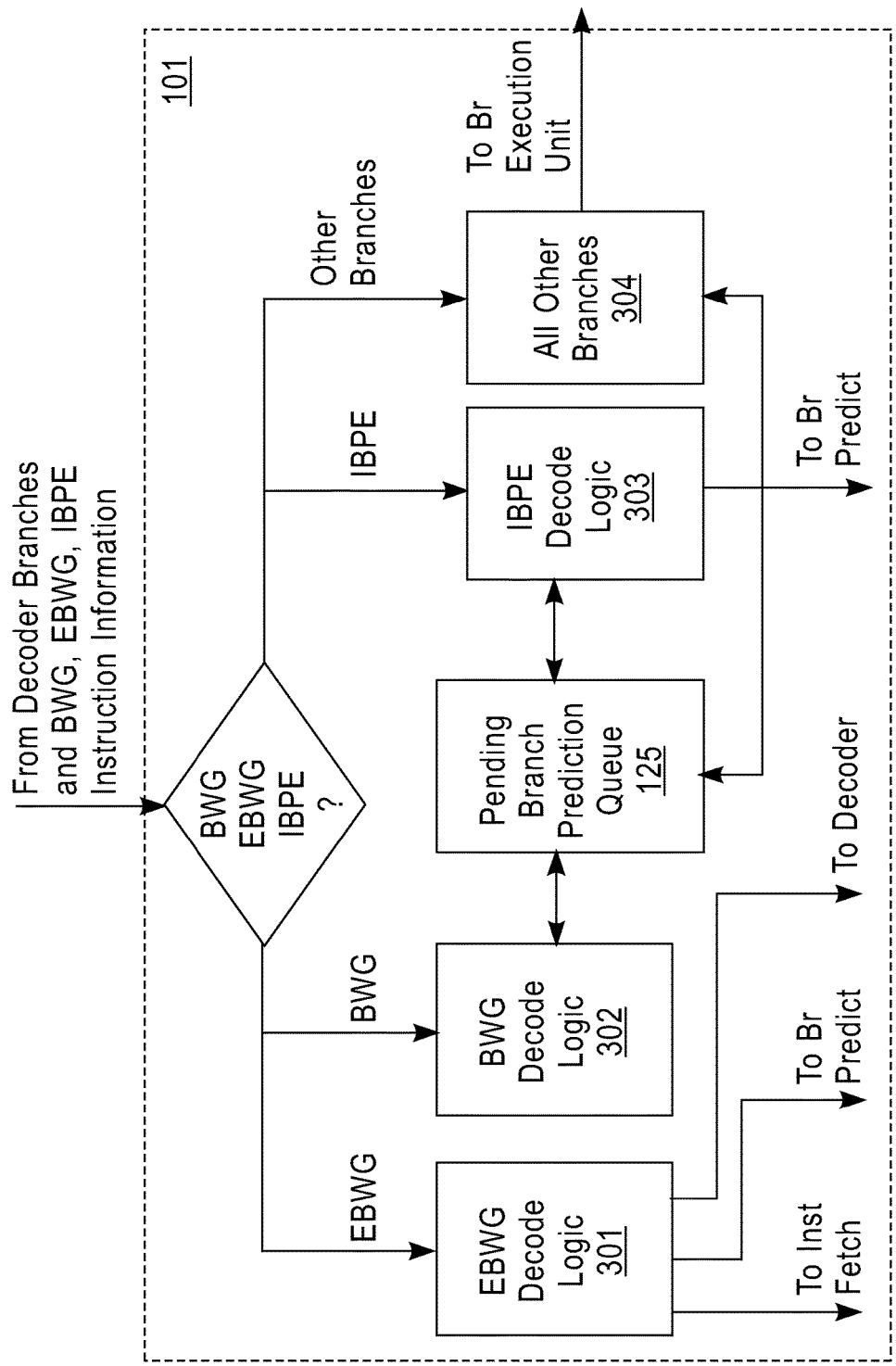
FIG. 16 illustrates a block diagram of an exemplary embodiment of the branch decode logic of FIG. 13.

FIG. 16 illustrates a block diagram of an exemplary embodiment of the branch decode logic 101 (of FIG. 13). The logic 101 includes four sub-units that communicate with information stored in the PBPQ 125. The sub-units include an EBWG decode logic 301, a BWG decode logic 302, an IBPE decode logic 303, and other branch logic 304. The branch logic 304 processes all other branches not found in this invention. The logic for processing the BWG, EBWG, and IBPE is described below.

Figure 17:
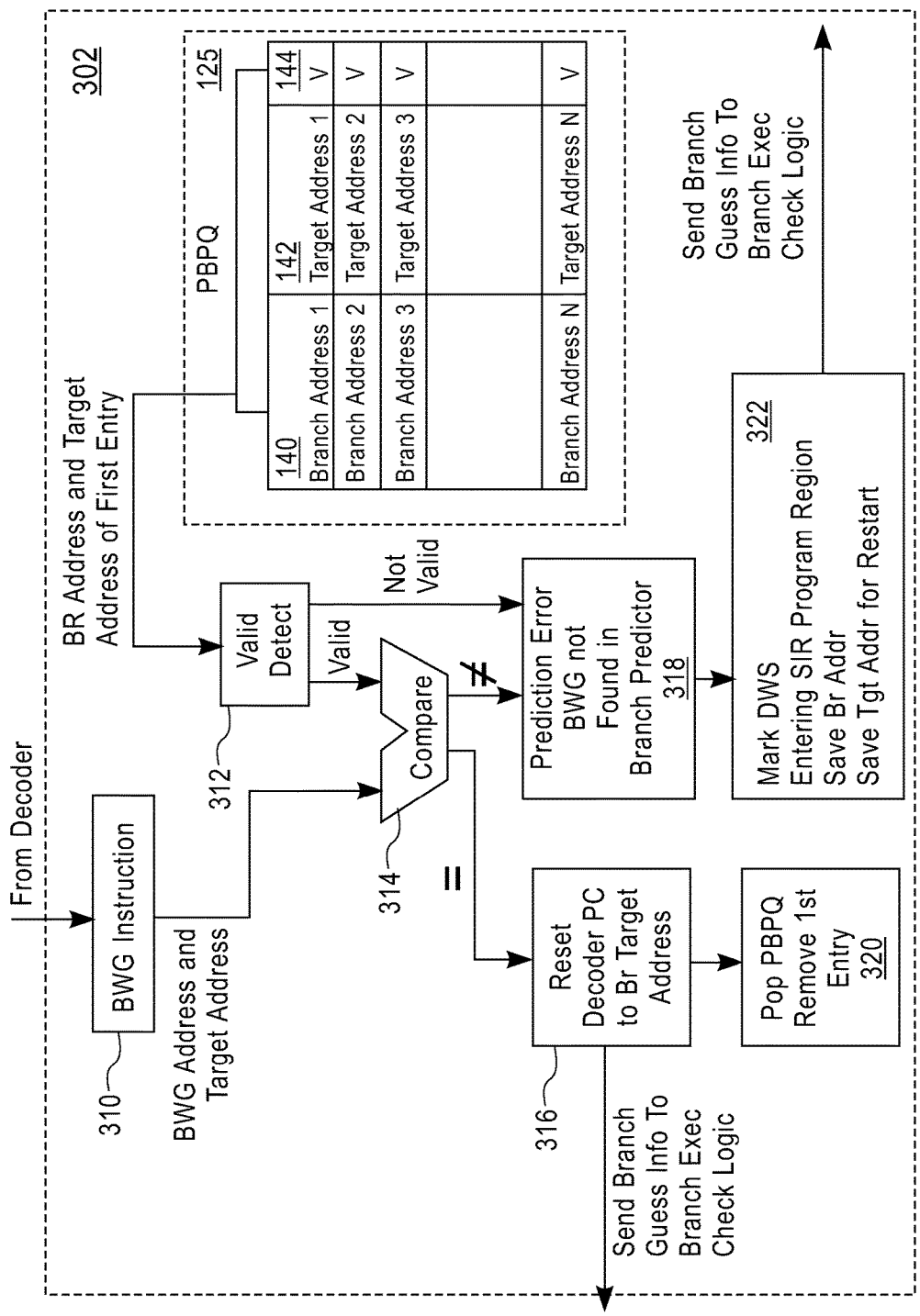
FIG. 17 illustrates a block diagram of an exemplary embodiment of the BWG decode logic of FIG. 16.

FIG. 17 illustrates a block diagram of an exemplary embodiment of the BWG decode logic 302 (of FIG. 16). The BWG decode logic 302 determines if the BWG instruction 310 was correctly guessed by the branch prediction mechanism, and avoids decoding down the wrong stream, i.e., the instructions in the SIR. After a BWG instruction 310 is decoded, the instruction address along with the associated target address are sent to a compare logic 314 to determine if the branch was correctly predicted. In parallel, the branch address and predicted target address from the first entry of the PBPQ are sent to a detect logic 312. If the entry is a valid entry, processing continues to the compare logic 314. If the entry is not valid, processing proceeds to a prediction error logic 318. If the BWG was not correctly predicted, the decoder 25 (of FIG. 12) begins decoding down the wrong stream and the instructions contained in the SIR are decoded (logic 322). Additionally, the address of the BWG instruction 310 and its target address are saved. This information, including predicted action and target address, is also sent to the execution unit 200 (of FIG. 12).

Returning to compare logic 314, if the first entry on the PBPQ 125 is valid, the branch address and predicted target address (from the PBPQ 125) are compared to the address and target address of the BWG instruction. If the addresses are equal, the branch prediction mechanism has correctly predicted the BWG, the branch is taken, and processing proceeds to reset logic 316 and 320. The prediction information is sent to the execution unit 200. This process avoids decoding the instructors in the SIR.

Figure 18:
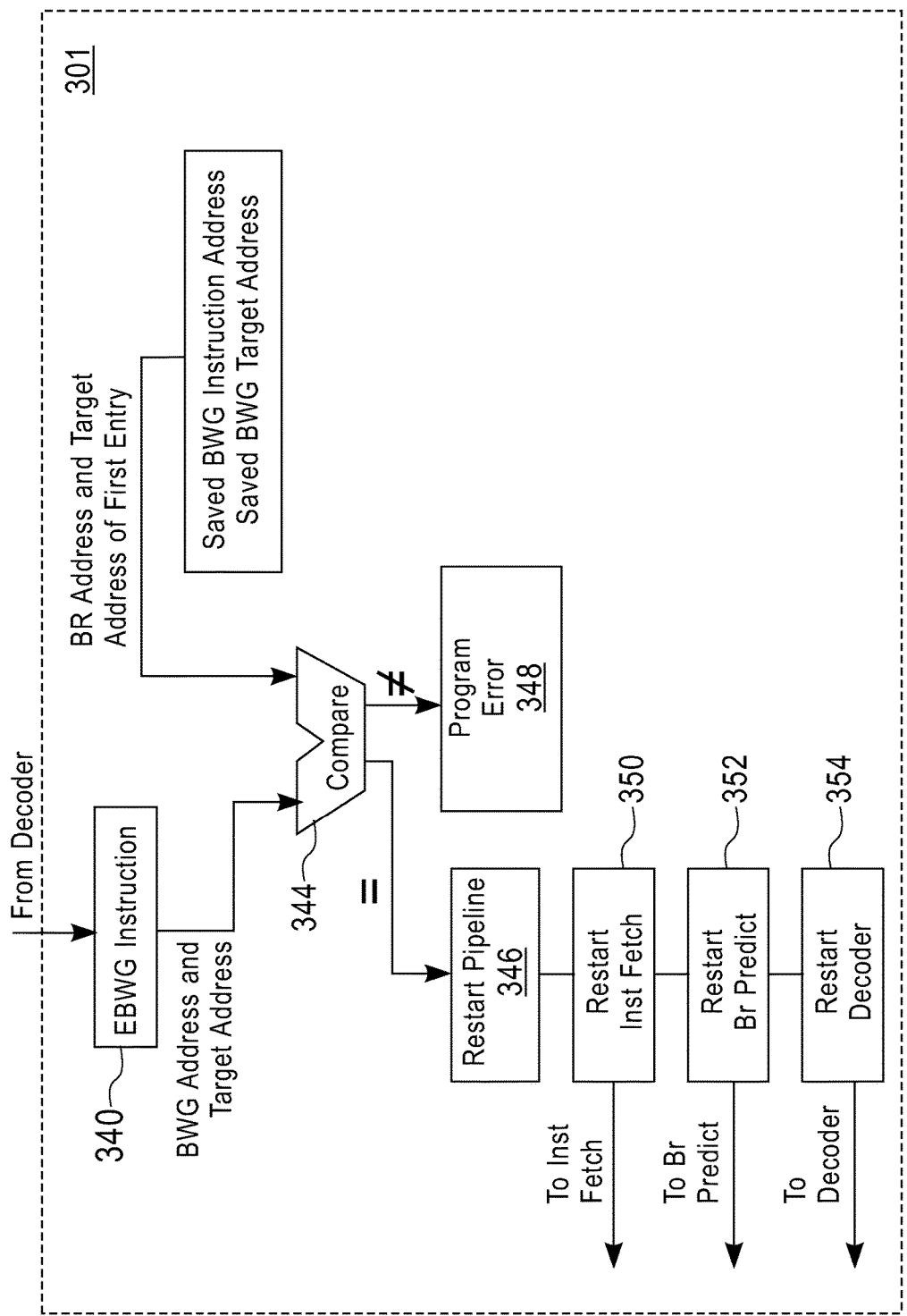
FIG. 18 illustrates a block diagram of an exemplary embodiment of the EBWG decode logic of FIG. 16.

FIG. 18 illustrates a block diagram of an exemplary embodiment of the EBWG decode logic 301 (of FIG. 16). The EBWG decode logic 301 terminates decoding down the wrong stream, and determines if the instruction matches the BWG instruction that started the prediction error. When an EBWG instruction 340 is decoded the two addresses specified in the instruction (the BWG address and target address) are sent to a compare logic 344. In parallel, the saved addresses from the matching BWG instruction are sent to the compare logic 344. If the addresses are equal, the pipeline is restarted at 346, and decoding down the wrong stream is terminated, and instruction fetching 350, branch prediction 352, and the decoder 354 are signaled to restart at the target address. If the address compare is not equal (from the logic 344) a program error has occurred, and a program interrupt occurs in block 348. There are many alternative designs to match the addresses in the EBWG with those from the BWG. The one presented in FIG. 18 is chosen for simplicity of design. Alternative designs, for example, may not logically determine that the addresses specified in the EBWG instruction 340 must match the addresses from the corresponding BWG instruction for operation.

There are many mechanisms that may signal the processor to stop decoding down the wrong stream and begin decoding down the correct path. The method described is chosen for simplicity and occurs when the EBWG instruction is decoded. In the preferred embodiment, the decoder switches to the correct path after the EBWG instruction is decoded. Alternative methods to signal the processor to switch to the correct path occur when the BWG instruction is finally executed. In the alternative embodiments, the decoder switches to the target address specified in the BWG (the correct path) following the execution of the BWG instruction.

Figure 19:
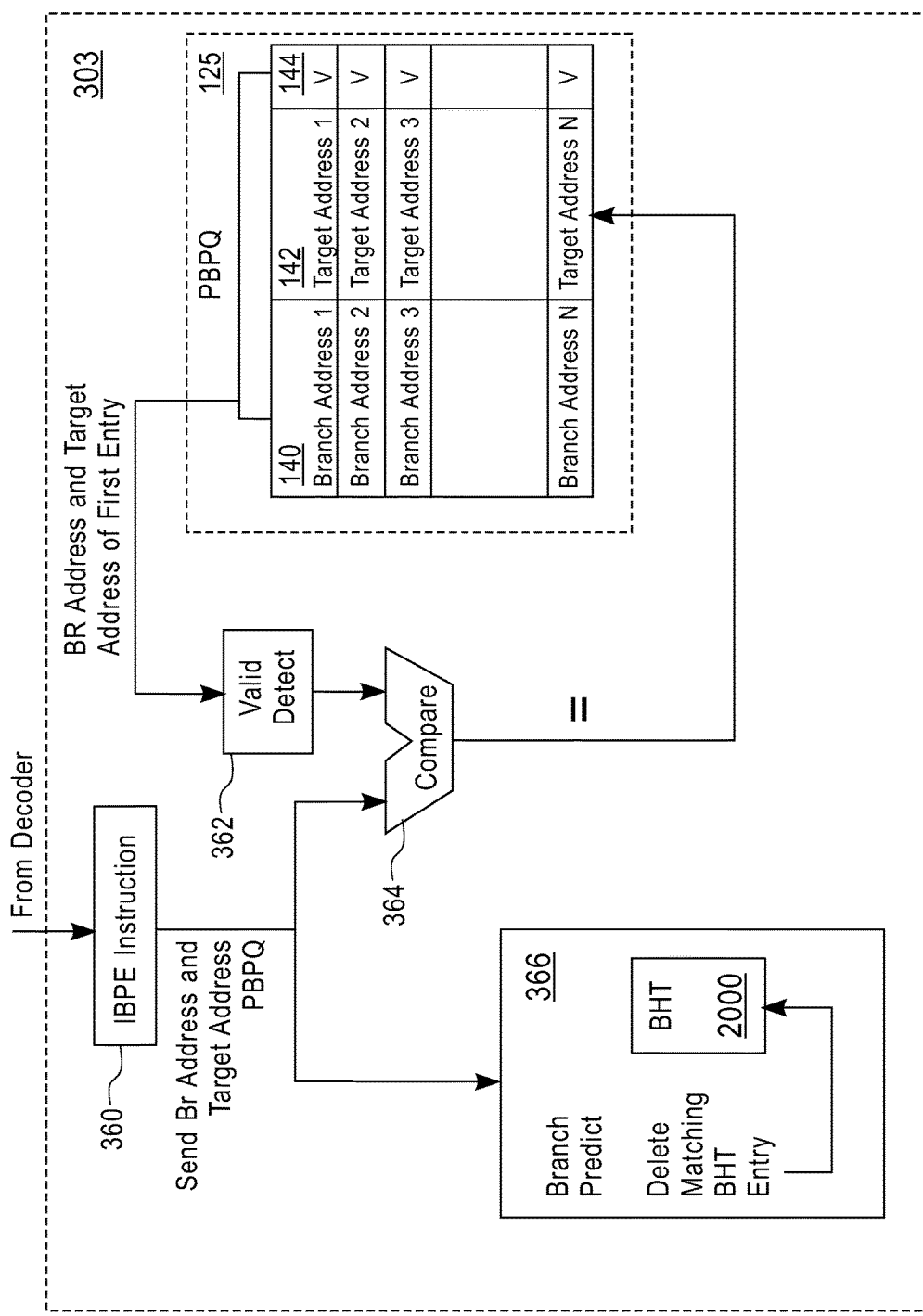
FIG. 19 illustrates a block diagram of an exemplary embodiment of the IBPE decode logic of FIG. 16.

FIG. 19 illustrates a block diagram of an exemplary embodiment of the IBPE decode logic 303 (of FIG. 16). In the IBPE decode logic 303 a branch is identified and the logic removes any branch information contained in the branch prediction mechanism. When an IBPE instruction 360 is decoded the branch and target address specified in the instruction are sent to the branch prediction mechanism and the PBPQ 125. A branch predict logic 366 searches a BHT 2000 for a matching branch address and target address. If a match is found, the information is removed (invalidated). If no match occurs, no action is taken. A compare logic 364 examines all valid entries from the PBPQ 125, via the valid detect 362. If a match occurs, the entry is invalidated.

Figure 20:
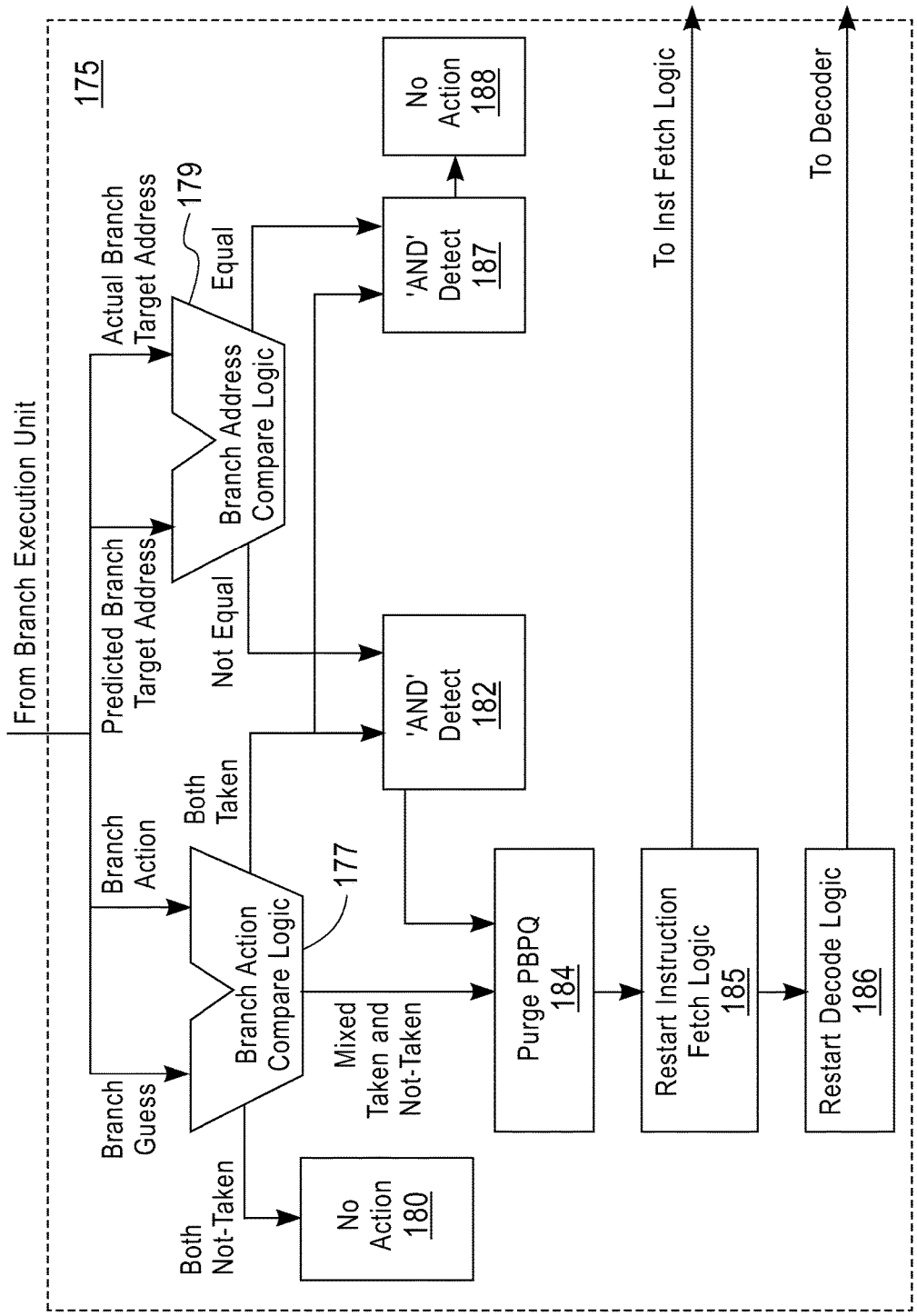
FIG. 20 illustrates an exemplary embodiment of a block diagram of the branch execution check logic of FIG. 13.

FIG. 20 illustrates an exemplary embodiment of a block diagram of the branch execution check logic 175 (of FIG. 13). When a branch is executed (including a BWG instruction) its prediction is checked by the branch execution check logic 175. FIG. 20 illustrates how the branch execution units return four items of information to the branch execution check logic. The returned information includes: a branch guess, i.e., the branch prediction (either taken or not-taken), made by the branch decode logic; a branch action, i.e., the actual branch action (either taken or not-taken); an actual branch target, ie., the actual target address of the branch is computed during the decode cycle; and the predicted target address, i.e., if the branch is predicted as taken, the predicted target address. The predicted target address is determined by the branch prediction mechanism and saved as an entry in the PBPQ. The branch guess and actual branch action (taken or not-taken) are compared using branch action logic 177, and the predicted branch address and true branch address are compared using branch address compare logic 179. The branch action compare logic 177 has three outputs. If the predicted action and actual branch action are not-taken, then no action is required (logic 180). If the predicted action and actual action are both taken, the results of the branch address compare logic 179 are checked. If the predicted branch address does not match the actual branch address, 'AND' detect logic 182 is activated and the PBPQ 125 is purged using logic 184. Additionally, the instruction fetching logic and decoder are notified to begin processing at the correct target address using logic 185 and 186. If the action was correctly predicted and the predicted branch address and actual branch address are equal, no action is required, logic 188. The third output from the branch action compare logic detects when the predicted branch direction does not match the actual branch direction. In the third output, the branch was either predicted as taken and was not taken or the branch was predicted as not-taken and was taken at execution time. When this occurs the prediction was incorrect and the pipeline is restarted. The PBPQ is purged using logic 184, and the instruction fetching logic and decoder are restarted following the branch or at the branch address using logic 185 and 186.

The technical effects and benefits of the above described embodiments provide a method and system for accurate and efficient branch prediction in a processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving, with a processor, a branch wrong guess instruction located at a branch wrong guess instruction address;
determining, by the processor, whether any branch address in a branch prediction mechanism matches the branch wrong guess instruction address;
subsequent to the determining whether any branch address in the branch prediction mechanism matches the branch wrong guess instruction address, receiving, by the processor, an end branch wrong guess instruction that includes the branch wrong guess instruction address, wherein the end branch wrong guess instruction is distinct and separate from the branch wrong guess instruction;
responsive to determining that the branch wrong guess instruction address does not match any branch address in the branch prediction mechanism:
 inducing a branch prediction error by prefetching an instruction immediately sequentially following the branch wrong guess instruction address; and
 decoding and executing instructions in a state invariant region, wherein the state invariant region is a two-instruction state invariant region comprising decode wrong stream instructions, and the state invariant region immediately sequentially follows the branch wrong guess instruction and immediately sequentially precedes the end branch wrong guess instruction; and
prefetching, by the processor, an instruction at a branch target address in response to the end branch wrong guess instruction, even if the branch wrong guess instruction has not yet been executed.

2. The method of claim 1, wherein the method further comprises:
storing the branch wrong guess instruction address in the branch prediction mechanism;
receiving the branch wrong guess instruction subsequent to the storing; and prefetching the instruction at the branch target address in response to determining the branch wrong guess instruction address matches any branch address in the branch prediction mechanism.

3. The method of claim 1, wherein the instructions in the state invariant region preserve any architected state of the processor defined prior to the execution of the instructions.

4. The method of claim 1, further comprising:
executing the branch wrong guess instruction;
restarting an instruction pipeline; and
ending the state invariant region, and receiving and decoding instructions at the branch target address responsive to executing the branch wrong guess instruction in an execution unit.

5. The method of claim 1, further comprising:
receiving an invalidate branch prediction entry instruction including a branch address corresponding to the branch wrong guess instruction; and
deleting the branch address from the branch prediction mechanism.

6. A computer program product, comprising:
a non-transitory computer-readable storage medium having program code embodied therewith, the program code executable by a computer to implement:
receiving a branch wrong guess instruction located at a branch wrong guess instruction address;
determining whether any branch address in a branch prediction mechanism matches the branch wrong guess instruction address;
subsequent to the determining whether any branch address in the branch prediction mechanism matches the branch wrong guess instruction address, receiving an end branch wrong guess instruction that includes the branch wrong guess instruction address, wherein the end branch wrong guess instruction is distinct and separate from the branch wrong guess instruction; and
responsive to determining the branch wrong guess instruction address does not match any branch address in the branch prediction mechanism:
inducing a branch prediction error by prefetching an instruction immediately sequentially following the branch wrong guess instruction address; and
decoding and executing instructions in a state invariant region that is a two-instruction state invariant region comprising decode wrong stream instructions, and the state invariant region immediately sequentially follows the branch wrong guess instruction and immediately sequentially precedes the end branch wrong guess instruction; and
prefetching an instruction at a branch target address in response to the end branch wrong guess instruction, even if the branch wrong guess instruction has not yet been executed.

7. The computer program product of claim 6, wherein the program code is further executable by the computer to implement:
storing the branch wrong guess instruction address in the branch prediction mechanism;
receiving the branch wrong guess instruction subsequent to the storing; and
prefetching an instruction at the branch target address in response to determining the branch wrong guess instruction address matches any branch address in the branch prediction mechanism.

8. The computer program product of claim 6, wherein the instructions in the state invariant region preserve any architected state of a processor of the computer defined prior to the execution of the instructions.

9. The computer program product of claim 6, wherein the program code is further executable by the computer to implement:
executing the branch wrong guess instruction in an execution unit;
restarting an instruction pipeline; and
ending the state invariant region, and receiving and decoding instructions at the branch target address responsive to executing the branch wrong guess instruction in the execution unit.

\* \* \* \* \*